United States Patent
Santo et al.

(10) Patent No.: US 8,368,801 B2
(45) Date of Patent: Feb. 5, 2013

(54) CAMERA SYSTEM AND INTERCHANGEABLE LENS

(75) Inventors: Takeo Santo, Osaka (JP); Naoto Yumiki, Osaka (JP); Yoshito Miyatake, Osaka (JP); Hiroshi Kubota, Osaka (JP)

(73) Assignee: Panasonic Corporation, Osaka (JP)

( * ) Notice: Subject to any disclaimer, the term of this patent is extended or adjusted under 35 U.S.C. 154(b) by 360 days.

(21) Appl. No.: 12/674,176

(22) PCT Filed: Aug. 26, 2008

(86) PCT No.: PCT/JP2008/002314
§ 371 (c)(1),
(2), (4) Date: Feb. 19, 2010

(87) PCT Pub. No.: WO2009/028174
PCT Pub. Date: Mar. 5, 2009

(65) Prior Publication Data
US 2011/0109788 A1 May 12, 2011

(30) Foreign Application Priority Data
Aug. 29, 2007 (JP) ................................ 2007-223273

(51) Int. Cl.
*H04N 5/232* (2006.01)
*G03B 13/00* (2006.01)

(52) U.S. Cl. .......................... 348/353; 396/72

(58) Field of Classification Search ............ 348/207.99, 348/345–357, 360; 396/72–152; 359/196.1–226.2, 359/425–427, 697, 819–830; 352/140
See application file for complete search history.

(56) References Cited

U.S. PATENT DOCUMENTS

| 5,287,223 | A | * | 2/1994 | Hirasawa | 359/697 |
| 6,683,652 | B1 | | 1/2004 | Ohkawara et al. | |
| 2002/0118965 | A1 | * | 8/2002 | Ogg et al. | 396/79 |
| 2005/0168622 | A1 | * | 8/2005 | Kawai et al. | 348/360 |
| 2006/0165403 | A1 | * | 7/2006 | Ito | 396/123 |
| 2007/0269197 | A1 | * | 11/2007 | Ide et al. | 396/125 |
| 2008/0267601 | A1 | * | 10/2008 | Kobayashi | 396/91 |
| 2010/0091175 | A1 | * | 4/2010 | Shintani et al. | 348/345 |

FOREIGN PATENT DOCUMENTS

| JP | 63-61209 | 3/1988 |
| JP | 9-65186 | 3/1997 |
| JP | 2003-5022 | 1/2003 |
| JP | 2006-3417 | 1/2006 |
| JP | 2006-65355 | 3/2006 |

OTHER PUBLICATIONS

International Search Report of PCT Application No. PCT/JP2008/002314 dated Oct. 7, 2008.

* cited by examiner

*Primary Examiner* — Nelson D. Hernández Hernández
*Assistant Examiner* — Dennis Hogue
(74) *Attorney, Agent, or Firm* — Panasonic Patent Center

(57) ABSTRACT

There are provided a camera system and an interchangeable lens that are compatible with a contrast detection method. A camera system (1) has an interchangeable lens unit (2) and a camera body (3). A lens microcomputer (40) changes the movable range of a second lens group (L2) via a focus lens drive controller (41) depending on whether a second holder (61) is driven by the focus lens drive controller (41) and a focus motor (80) on the basis of angle information inputted to a zoom ring (64) of the interchangeable lens unit (2), or the second holder (61) is driven by the focus lens drive controller (41) on the basis of contrast information.

4 Claims, 13 Drawing Sheets

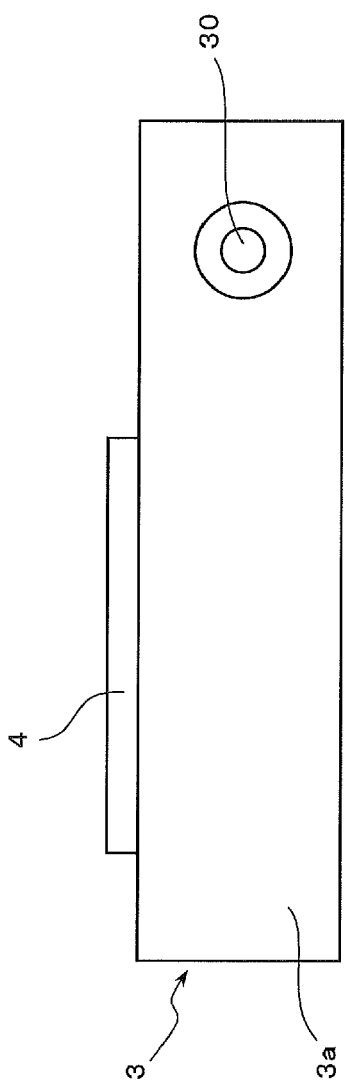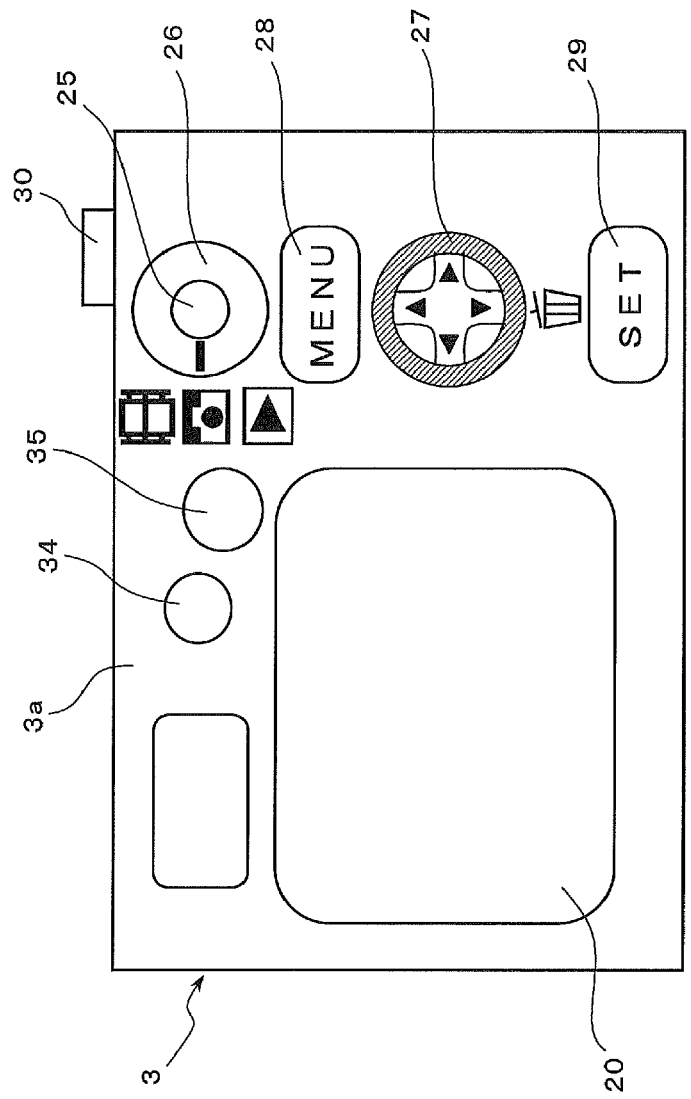
FIG. 3B
FIG. 3A

CAMERA SYSTEM AND INTERCHANGEABLE LENS

CROSS-REFERENCE TO RELATED APPLICATIONS

This U.S. National stage application claims priority under 35 U.S.C. 119a to Japanese Patent Application No. 2007-223273 filed in Japan on Aug. 29, 2007 the entire contents of which are incorporated herein by reference.

TECHNICAL FIELD

The technology disclosed here relates to a camera system and an interchangeable lens, and more particularly to a camera system and an interchangeable lens used in an interchangeable lens type of digital camera.

BACKGROUND ART

Digital single lens reflex cameras, with which an optical image of a subject is converted into an electrical image signal and outputted, have rapidly grown in popularity in recent years. With these digital single lens reflex cameras, when the user views a subject through the viewfinder, the light incident on the imaging lens (that is, the subject image) is reflected by a reflecting mirror disposed along the imaging optical path beyond the lens, which changes the optical path and sends the subject image through a pentaprism or the like to create a positive image, and guides this to an optical viewfinder. This allows the subject image that has passed through the lens to be seen through the optical viewfinder. Therefore, the position where the viewfinder optical path is formed usually becomes the home position of the reflecting mirror.

Meanwhile, when a lens is used for imaging, the reflecting mirror changes its position instantly and is retracted from the imaging optical path so that the viewfinder optical path is switched to the imaging optical path, and then instantly returns to its home position when imaging is over. With a single-lens reflex camera, this operation is the same regardless of whether the camera is a conventional silver halide camera or a digital camera.

One of the features of a digital camera is that imaging is performed while the user looks at a display device (such as a liquid crystal monitor), and the captured image can be checked right after it is captured. However, when a conventional single lens reflex reflecting mirror is used, a liquid crystal monitor cannot be used during imaging. Since imaging cannot be performed by using a liquid crystal monitor, the user has to look through the viewfinder during imaging, so conventional camera systems have been extremely difficult to use, especially for novices who are inexperienced in using digital cameras.

In view of this, there has been a proposal for a digital single lens reflex camera with which imaging can be performed while looking at a liquid crystal monitor.

Also, with a digital single lens reflex camera, phase difference detection is generally employed as the focus point detection method (see Patent Citation 1, for example).

Patent Citation 1: Japanese Laid-Open Patent Application 2006-3417

DISCLOSURE OF INVENTION

Since a reflecting mirror is used with phase difference detection, however, the reflecting mirror has to be inserted into the optical path in detecting the focus point, which means that the image displayed on the liquid crystal monitor is temporarily interrupted during focusing, and this is distracting to the user.

In view of this, it has been proposed that a contrast detection method, in which focus point detection is performed on the basis of contrast information found from an image signal, be employed in digital single lens reflex cameras.

However, with a contrast detection method, the focus lens has to be moved by an extra amount around the focus position, so if contrast detection of the conventional type is used without modification, there is not enough movable area for the focus lens, and the focus position cannot be accurately ascertained around the ends of the movable area of the focus lens.

Also, if the movable area of the focus lens is expanded, the drive control of the focus lens must be changed accordingly, and no proposal for this has been made up to now.

One object is to provide a camera system and interchangeable lens that are compatible with the contrast detection method.

A camera system according to a first aspect comprises an interchangeable lens and a camera body. The interchangeable lens has an imaging optical system that has a focus lens and that forms an optical image of a subject, a lens barrel that is a mechanism for supporting the imaging optical system and that has a focus lens support frame for supporting the focus lens movably in a direction along the optical axis, a focus driver that drives the focus lens support frame, an information input part with which position information about the focus lens can be inputted, and a lens controller that controls the operation of the focus driver. The camera body has an imaging part that converts an optical image into an image signal, a contrast information acquisition part that acquires contrast information for focus point detection on the basis of the image signal, and a body controller that controls the operation of the imaging part and the contrast information acquisition part and with which information can be exchanged with the lens controller. The lens controller changes the movable area of the focus lens via the focus driver depending on whether the focus lens support frame is driven by the focus driver on the basis of the position information inputted to the information input part, or the focus lens support unit frame is driven by the focus driver on the basis of the contrast information.

With this camera system, the lens controller changes the movable area of the focus lens via the focus driver depending on whether the focus lens support frame is driven by the focus driver on the basis of the position information inputted to the information input part, or the focus lens support frame is driven by the focus driver on the basis of the contrast information. Therefore, this prevents the surplus movable area that is needed in acquiring the contrast information from being used during manual imaging in which the focus lens support frame is driven on the basis of position information.

Consequently, this camera system is compatible with the contrast detection method.

A camera system according to a second aspect is the camera system according to the first aspect, wherein, when the focus lens support frame is driven by the focus driver on the basis of the contrast information, the focus lens is able to move within a zoom area corresponding to from the wide angle end of the imaging optical system to the telephoto end, and a surplus area used during focus point detection and provided outside of the zoom area. When the focus lens support frame is driven by the focus driver on the basis of the position information inputted to the information input part, the focus lens is able to move only within the zoom area.

A camera system according to a third aspect is the camera system according to the second aspect, wherein the focus lens support frame has a cam groove. The cam groove has an imaging groove section corresponding to the zoom area, and a surplus groove section having an inflection point corresponding to the surplus area.

An interchangeable lens according to a fourth aspect comprises an imaging optical system, a lens barrel, a focus driver, an information input part, and a lens controller. The imaging optical system has a focus lens and that forms an optical image of a subject. The lens barrel is a mechanism for supporting the imaging optical system and has a focus lens support frame for supporting the focus lens movably in a direction along the optical axis. The focus driver drives the focus lens support frame. The information input part allows position information about the focus lens to be inputted. The lens controller controls the operation of the focus driver. The lens controller changes the movable area of the focus lens via the focus driver depending on whether the focus lens support frame is driven by the focus driver on the basis of the position information inputted to the information input part, or the focus lens support frame is driven by the focus driver on the basis of the contrast information.

With this interchangeable lens, the lens controller changes the movable area of the focus lens via the focus driver depending on whether the focus lens support frame is driven by the focus driver on the basis of the position information inputted to the information input part, or the focus lens support frame is driven by the focus driver on the basis of the contrast information. Therefore, this prevents the surplus movable area that is needed in acquiring the contrast information from being used during manual imaging in which the focus lens support frame is driven on the basis of position information.

Consequently, this camera system is compatible with the contrast detection method.

BRIEF DESCRIPTION OF DRAWINGS

FIG. 3A is a simplified diagram of the camera body constitution,
and FIG. 3B is a simplified diagram of the camera body constitution.

Figure 1:
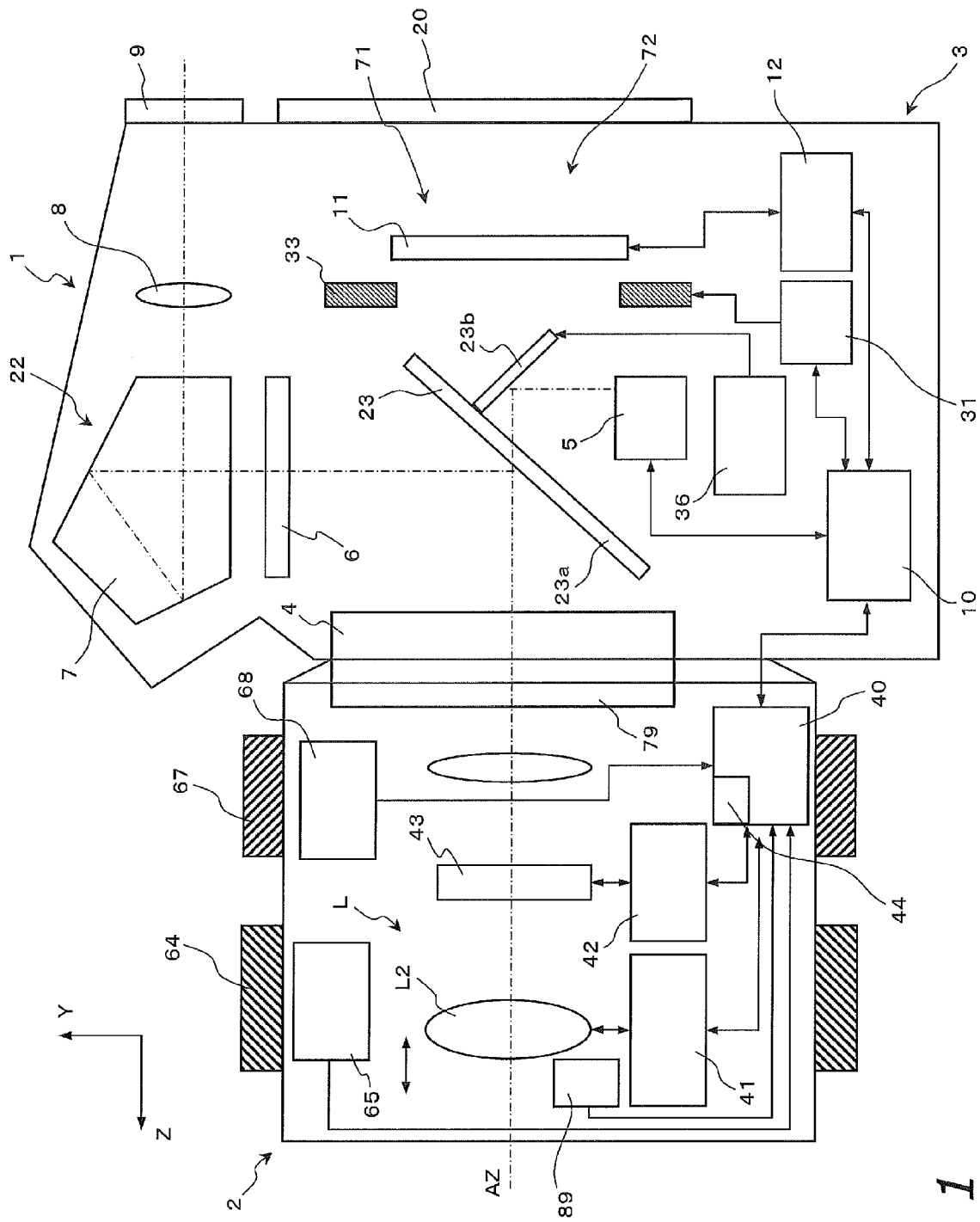
FIG. 1 is a block diagram of the constitution of a camera system.

DESCRIPTION OF REFERENCE NUMERALS 1 camera system
2 interchangeable lens unit
3 camera body
3a case
4 body mount
10 body microcomputer (body controller)
11 imaging sensor (imaging part)
12 imaging sensor drive controller
20 display unit
21 image display controller
23 quick return mirror
25 power switch
26 mode switching dial
27 navigation key
28 menu setting button
29 set button
30 shutter control interface
31 shutter controller
33 shutter unit
34 viewfinder switching button
35 moving picture imaging button
40 lens microcomputer (lens controller)
41 focus lens drive controller
58 second lens support frame (focus lens support frame)
61 second holder (focus lens support frame)
61a cam through-groove (cam groove)
79 lens mount
95 electronic viewfinder
L imaging optical system
L1 first lens group
L2 second lens group
L3 third lens group
L4 fourth lens group
E1 zoom area
E2 first surplus area (surplus area)
E3 second surplus area

BEST MODE FOR CARRYING OUT THE INVENTION

Embodiments will now be described in detail through reference to the drawings.

1: Overall Configuration of Camera System

Figure 2:
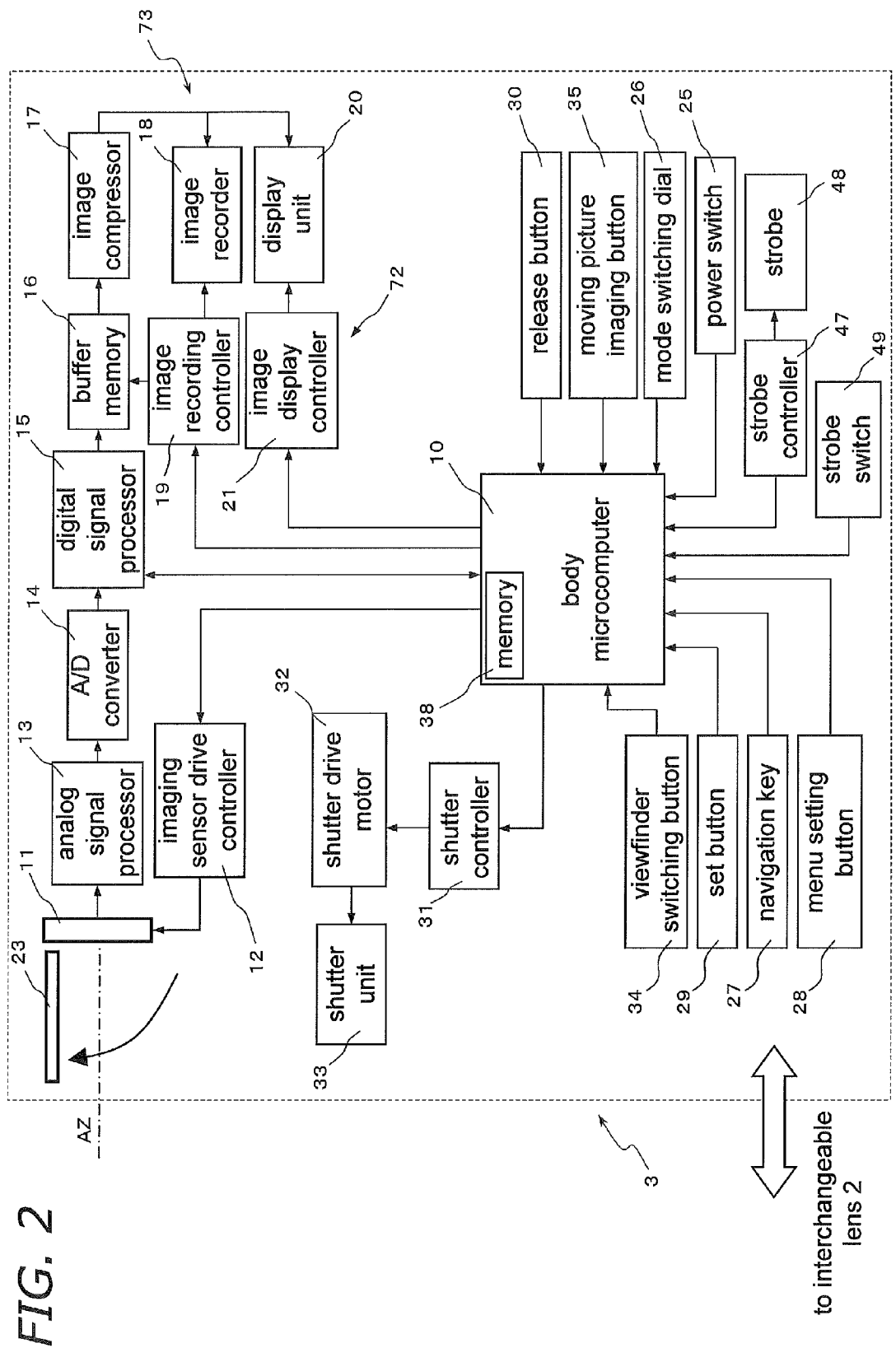
FIG. 2 is a block diagram of the constitution of a camera body.

The overall configuration of a camera system 1 according to the first embodiment will be described through reference to FIGS. 1 through 3B. FIG. 1 is a block diagram of the camera system 1. FIG. 2 is a block diagram of a camera body 3. FIGS. 3A and 3B are simplified diagrams of the camera body 3.

As shown in FIG. 1, the camera system 1 is a system used in an interchangeable lens type of single lens reflex digital camera, and mainly comprises a camera body 3 having the primary function of the camera system 1, and an interchangeable lens unit 2 that is removably mounted to the camera body 3. The interchangeable lens unit 2 is mounted via a lens mount 79 to a body mount 4 provided to the front face of the camera body 3.

1.1: Camera Body

As shown in FIGS. 1 and 2, the camera body 3 mainly comprises an imaging part 71 for forming an image of a subject, a body microcomputer 10 serving as a body controller for controlling the operation of the various components such as the imaging unit 71, an image display unit 72 for displaying the captured image and various kinds of information, an image holder 73 for holding image data, and a viewfinder optical system 22 through which the subject image can be seen.

The imaging unit 71 mainly comprises a quick return mirror 23 for guiding incident light to the viewfinder optical system 22 and focus point detection unit 5, an imaging sensor 11 such as a CCD (charge coupled device) for performing photoelectric conversion, a shutter unit 33 for adjusting the exposure state of the imaging sensor 11, a shutter controller 31 for controlling the drive of the shutter unit 33 on the basis of a control signal from the body microcomputer 10, an imaging sensor drive controller 12 for controlling the operation of the imaging sensor 11, and the focus point detection unit 5 for detecting the focus point (the focus state of the subject image).

The focus point detection unit 5 performs focus detection by an ordinary phase difference detection method, for example. As to the focus detection method, either phase difference detection, in which the above-mentioned focus point detection unit 5 is used, or contrast detection, which is based on an image signal outputted from the imaging sensor 11, can be used depending on the usage state of the camera system 1.

In the case of contrast detection, contrast information is found by the body microcomputer 10, and the focus point is detected. Specifically, the body microcomputer 10 can be said to include a contrast information acquisition part. The focus position information acquired by the body microcomputer 10 is sent to a lens microcomputer 40 (discussed below) and used for the drive of the focus lens (second lens group L2). Details of the contrast detection method will be discussed below.

The imaging sensor 11 is, for example, a CCD (charge coupled device) sensor that converts the optical image formed by an imaging optical system L into an electrical signal. The drive of the imaging sensor 11 is controlled by a timing signal generated by an imaging sensor drive controller 12. The imaging sensor 11 may instead be a CMOS (complementary metal oxide semiconductor) sensor.

The body microcomputer 10 is a control device serving as the functional center of the camera body 3, and controls various sequences. More specifically, the body microcomputer 10 is equipped with a CPU, ROM, and RAM, and the body microcomputer 10 can perform many different functions when programs held in the ROM are read into the CPU. For instance, the body microcomputer 10 has the function of detecting that the interchangeable lens unit 2 has been mounted on the camera body 3, the function of acquiring information essential to the control of the camera system 1, such as information about the focal length from the interchangeable lens unit 2, and controlling the operation of the interchangeable lens unit 2, and so on. As shown in FIG. 1, the body microcomputer 10 is connected to the various components provided to the camera main body 3.

Also, the body microcomputer 10 can receive signals from the power switch 25, the release button 30, the mode switching dial 26, the navigation key 27, the menu setting button 28, the set button 29, the viewfinder switching button 34, and the moving picture imaging button 35 shown in FIG. 3B. The body microcomputer 10 is an example of the body controller.

Furthermore, as shown in FIG. 2, a memory 38 in the body microcomputer 10 holds various kinds of information related to the camera body 3 (body information). This body information includes, for example, information related to the model, for identifying the camera body 3, such as the name of the manufacturer of the camera body 3, the date of manufacture, the model number, the version of software installed in the body microcomputer 10, and information related to firmware updates (this is called camera identification information). Further, the memory 38 can store information sent from the lens microcomputer 40.

The body microcomputer 10 controls the entire camera system, such as the imaging sensor 11, according to commands from the release button 30 and so forth. The body microcomputer 10 sends a vertical synchronization signal to a timing generator. In parallel with this, the body microcomputer 10 generates an exposure synchronization signal on the basis of the vertical synchronization signal. The body microcomputer 10 repeatedly and periodically sends the generated exposure synchronization signal through the body mount 4 and the lens mount 79 to the lens microcomputer 40.

The body mount 4 can be mechanically and electrically connected to the lens mount 79 of the interchangeable lens unit 2. The body mount 4 is able to exchange data with the interchangeable lens unit 2 via the lens mount 79. For example, the body mount 4 may send an exposure synchronization signal received from the body microcomputer 10 to the lens microcomputer 40 via the lens mount 79. Also, the body mount 4 may send other control signals received from the body microcomputer 10 to the lens microcomputer 40 via the lens mount 79. The body mount 4 may also send the body microcomputer 10 a signal received from the lens microcomputer 40 via the lens mount 79. The body mount 4 supplies the power supplied from a power supply unit (not shown) through the lens mount 79 to the entire interchangeable lens unit 2.

As shown in FIGS. 3A and 3B, the case 3a of the camera body 3 is held by the user during the imaging of a subject. On the rear face of the case 3a are provided a display unit 20, the power switch 25, the mode switching dial 26, the navigation key 27, the menu setting button 28, the set button 29, the viewfinder switching button 34, and the moving picture imaging button 35.

The power switch 25 is used to turn on and off the power to the camera system 1 or the camera body 3. When the power has been turned on with the power switch 25, power is supplied to the various components of the camera body 3 and the interchangeable lens unit 2. The mode switching dial 26 is used to switch between still picture mode, moving picture mode, and reproduction mode, and the user can turn the mode switching dial 26 to switch the mode. When the still picture mode has been selected with the mode switching dial 26, the imaging mode can be switched to the still picture mode, and when the moving picture mode has been selected with the mode switching dial 26, the imaging mode can be switched to the moving picture mode. In moving picture mode, basically moving picture imaging is possible. Further, when reproduction mode has been selected with the mode switching dial 26, the mode can be switched to reproduction mode, and a moving picture image can be displayed on the display unit 20.

The menu setting button 28 is used to set the various operations of the camera system 1. The navigation key 27 is pressed at the top, bottom, left, or right by the user to select the desired menu from various menus screens displayed on the display unit 20. The set button 29 is used to execute the various menu commands. The viewfinder switching button 34 switches between viewfinder imaging mode and monitor imaging mode. The moving picture imaging button 35 is used to start or stop moving picture imaging, and even if the imaging mode set with the mode switching dial 26 is the still picture mode or the reproduction mode, when this moving picture imaging button 35 is pressed, the moving picture mode is forcibly commenced regardless of the setting on the mode switching dial 26. Furthermore, in moving picture mode, pressing the moving picture imaging button 35 ends moving picture imaging and switches to still picture mode or reproduction mode.

As shown in FIG. 3B, the release button 30 is provided to the upper face of the case 3a. When the release button 30 is pressed, a timing signal is outputted to the body microcomputer 10. The release button 30 is a two-stage switch that can be pressed halfway down or all the way down, and when the user presses the release button 30 halfway down, photometry and range finding are commenced. Also, when the button is pressed halfway down, power is supplied to the various components, including the body microcomputer 10 and the lens microcomputer 40. When the user then presses the release button 30 all the way down, a timing signal is outputted to the body microcomputer 10. The shutter controller 31 drives a shutter driver motor 32 and operates the shutter unit 33 according to the control signal outputted from the body microcomputer 10 upon receipt of the timing signal.

As shown in FIG. 2, in still picture mode, the body microcomputer 10 that has received a timing signal upon the pressing of the release button 30 outputs a control signal to a strobe controller 47. The strobe controller 47 flashes a strobe 48 comprising an LED or the like on the basis of the control signal. The strobe 48 is controlled according to the amount of light received by the imaging sensor 11. Specifically, the strobe controller 47 automatically flashes in conjunction with the shutter operation when the output of an image signal from the imaging sensor 11 is at or below a specific value. On the other hand, the strobe controller 47 is controlled so that it does not flash the strobe 48 when the output of the image signal is above a specific value.

A strobe switch 49 is used to set the operation of the strobe 48 regardless of the output of the imaging sensor 11. Specifically, the strobe controller 47 flashes the strobe 48 when the strobe switch 49 is "on," and does not flash the strobe 48 when the strobe 48 is "off."

In moving picture mode, when the release button 30 or the moving picture imaging button 35 is pressed, the strobe 48 (comprising an LED or the like) functions as a video light, which shines light toward the subject during moving picture imaging.

The image signal outputted from the imaging sensor 11 (a still or moving picture) is sent for processing from an analog signal processor 13 to an A/D converter 14, a digital signal processor 15, a buffer memory 16, and an image compressor 17, in that order. The analog signal processor 13 performs gamma processing or other such analog signal processing on the image signal outputted from the imaging sensor 11. The A/D converter 14 converts the analog signal outputted from the analog signal processor 13 into a digital signal. The digital signal processor 15 subjects the image signal converted into a digital signal by the A/D converter 14 to digital signal processing, such as noise elimination or contour enhancement. The buffer memory 16 is a RAM, which temporarily stores image signals.

The image signal stored in the buffer memory 16 is sent from the image compressor 17 to an image recorder 18 for processing. The image signal stored in the buffer memory 16 is read at a command from an image recording controller 19 and sent to the image compressor 17. The image signal data sent to the image compressor 17 is compressed into an image signal according to a command from the image recording controller 19. This compression reduces the image signal to a smaller data size than that of the original data. The compression method can be, for example, JPEG (Joint Photographic Experts Group) in the case of a still picture. In the case of a moving picture, MPEG (Moving Picture Experts Group) is used. Also, an H.264/AVC format in which a plurality of frames of image signals are compressed together can be used. The compressed image signal is recorded to the image recorder 18 by the image recording controller 19.

The image recorder 18 is an internal memory or a removable memory, for example, that records while referencing specific information to be recorded with the image signal on the basis of a command from the image recording controller 19. The specific information to be recorded along with the image signal includes the date and time the image was captured, focal length information, shutter speed information, aperture value information, and imaging mode information. The format of the information in this still picture files can be the Exif (registered trademark) format or the like. Moving picture files may be in, for example, an H.264/AVC format or a format similar to an H.264/AVC format.

The display unit 20 is a liquid crystal monitor, for example, and displays as a visible image the image signal recorded to the image recorder 18 or the buffer memory 16 based on a command from an image display controller 21. The display modes of the display unit 20 here are a display mode in which just the image signal is displayed as a visible image, and a display mode in which the image signal and information from the time of capture are displayed as a visible image. The display unit 20 may be a variable-angle monitor with which the angle can be freely changed with respect to the case 3a of the camera body 3.

As shown in FIG. 1, the quick return mirror 23 is constituted by a main mirror 23a capable of reflecting and transmitting incident light, and a sub-mirror 23b that is provided on the rear face side of the main mirror 23a and reflects light conducted by the main mirror 23a. The quick return mirror 23 is can be flipped up outside the optical axis AZ by a quick return mirror controller 36. The incident light is split into two beams by the main mirror 23a, and the reflected beam is guided to the viewfinder optical system 22.

Meanwhile, the transmitted beam is reflected by the sub-mirror 23b and utilized as an AF light beam of the focus point detection unit 5. During ordinary imaging, the quick return mirror 23 is flipped up outside the optical axis AZ by the quick return mirror controller 36, the shutter unit 33 is opened, and a subject image is formed on the imaging face of the imaging sensor 11. When imaging is not being performed, as shown in FIG. 1, the quick return mirror 23 is disposed along the optical axis AZ, and the shutter unit 33 is closed.

The viewfinder optical system 22 is constituted by a viewfinder screen 6 on which a subject image is formed, a pentaprism 7 that converts the subject image into an erect image, an eyepiece lens that guides the erect image of the subject to a viewfinder eyepiece window 9, and the viewfinder eyepiece window 9 that is used by the user to view the subject image.

1.2: Interchangeable Lens Unit

As shown in FIG. 1, the interchangeable lens unit 2 mainly comprises an imaging optical system L for forming an optical image of a subject on the imaging sensor 11 in the camera system 1, a focus lens drive controller 41 that performs focusing, an aperture drive controller 42 for adjusting the aperture, and the lens microcomputer 40 that serves as a lens controller for controlling the operation of the interchangeable lens unit 2.

The focus lens drive controller 41 mainly controls the drive of the second lens group L2 (focus lens; discussed below) that adjusts the focus. The aperture drive controller 42 mainly controls the drive of an aperture unit 43 for adjusting how open or closed the aperture is.

The lens microcomputer 40 is the main control apparatus for the interchangeable lens unit 2, and is connected to the various components installed in the interchangeable lens unit 2. More specifically, a CPU, ROM, and RAM are installed in the lens microcomputer 40, and the CPU reads the programs loaded in the ROM, which allows the lens microcomputer 40 to carry out its various functions. Also, the body microcomputer 10 and the lens microcomputer 40 are electrically connected by electrical contacts (not shown) provided to the lens mount 79, allowing information to be exchanged between the two.

Various information (lens information) related to the interchangeable lens unit 2 is stored in a memory 44 of the lens microcomputer 40. More specifically, focal length information indicating the maximum and minimum values for focal length of the interchangeable lens unit 2 (focal length variable range), or the object point distance, etc., is stored. The various information stored in the memory 44 is sent to the camera body 3 side when the interchangeable lens unit 2 is attached to the camera body 3 so that it can be used during imaging.

Figure 4:
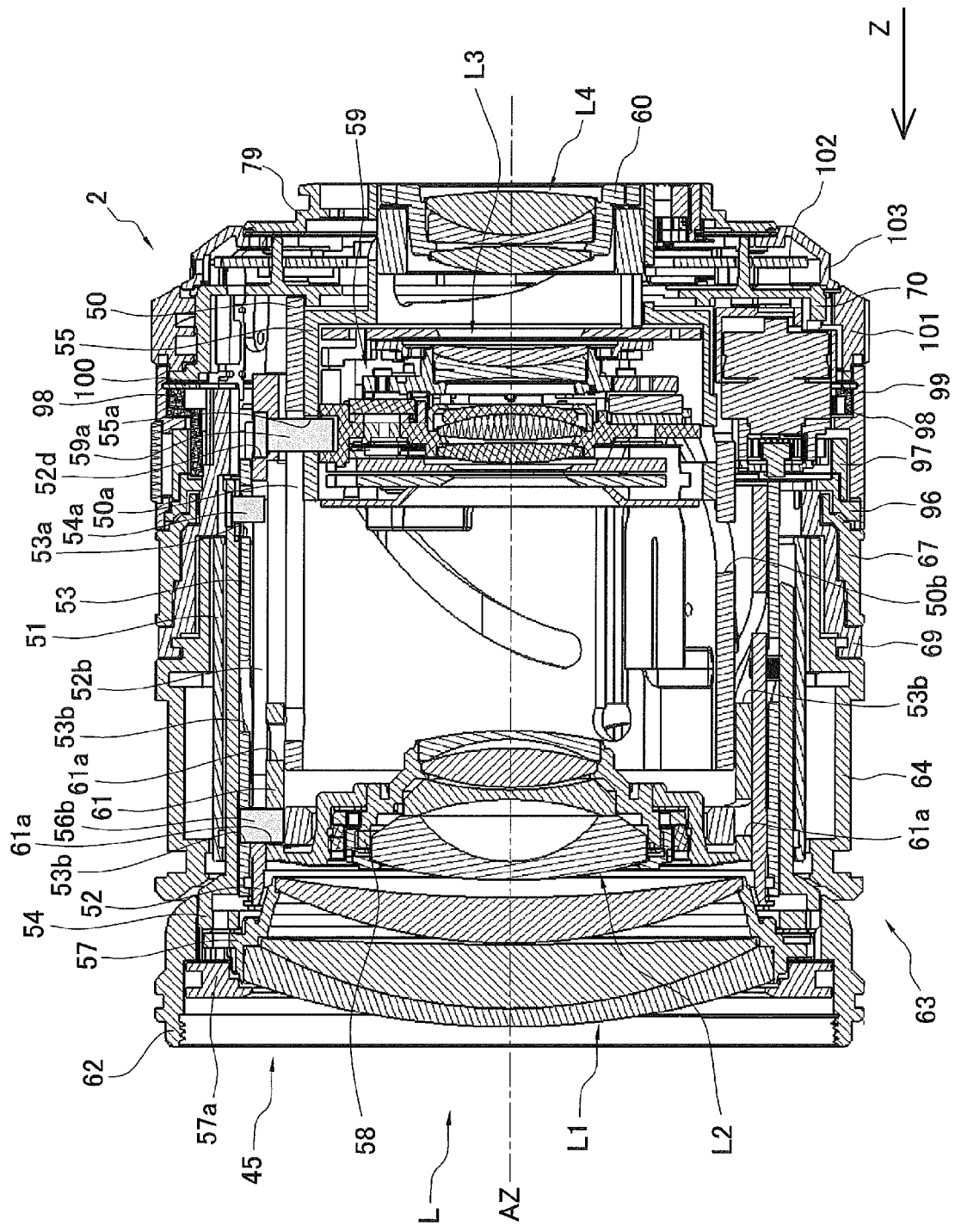
FIG. 4 is a cross section at the wide angle end of an interchangeable lens unit.
Figure 5:
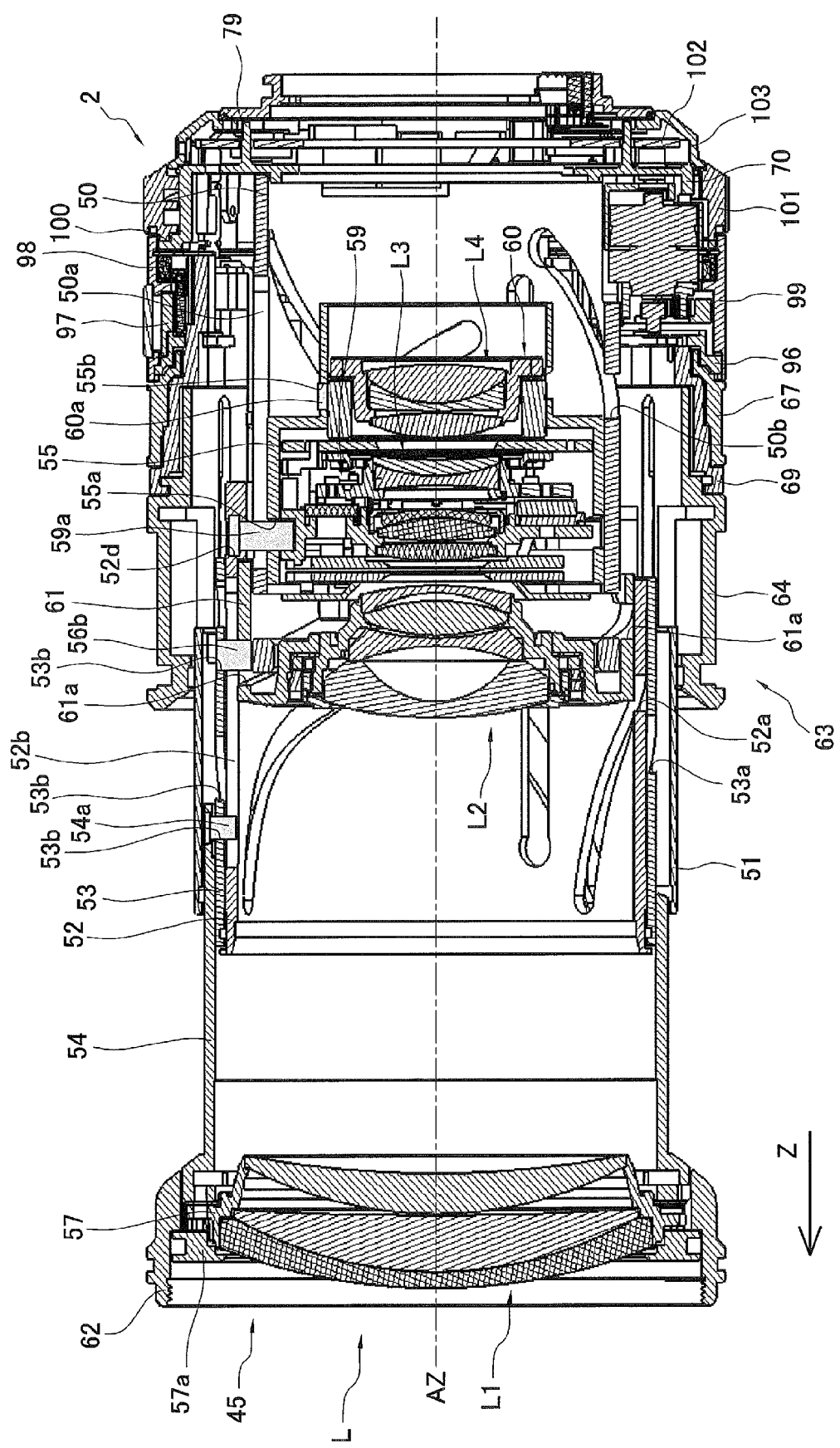
FIG. 5 is a cross section at the telephoto end of an interchangeable lens unit.
Figure 6:
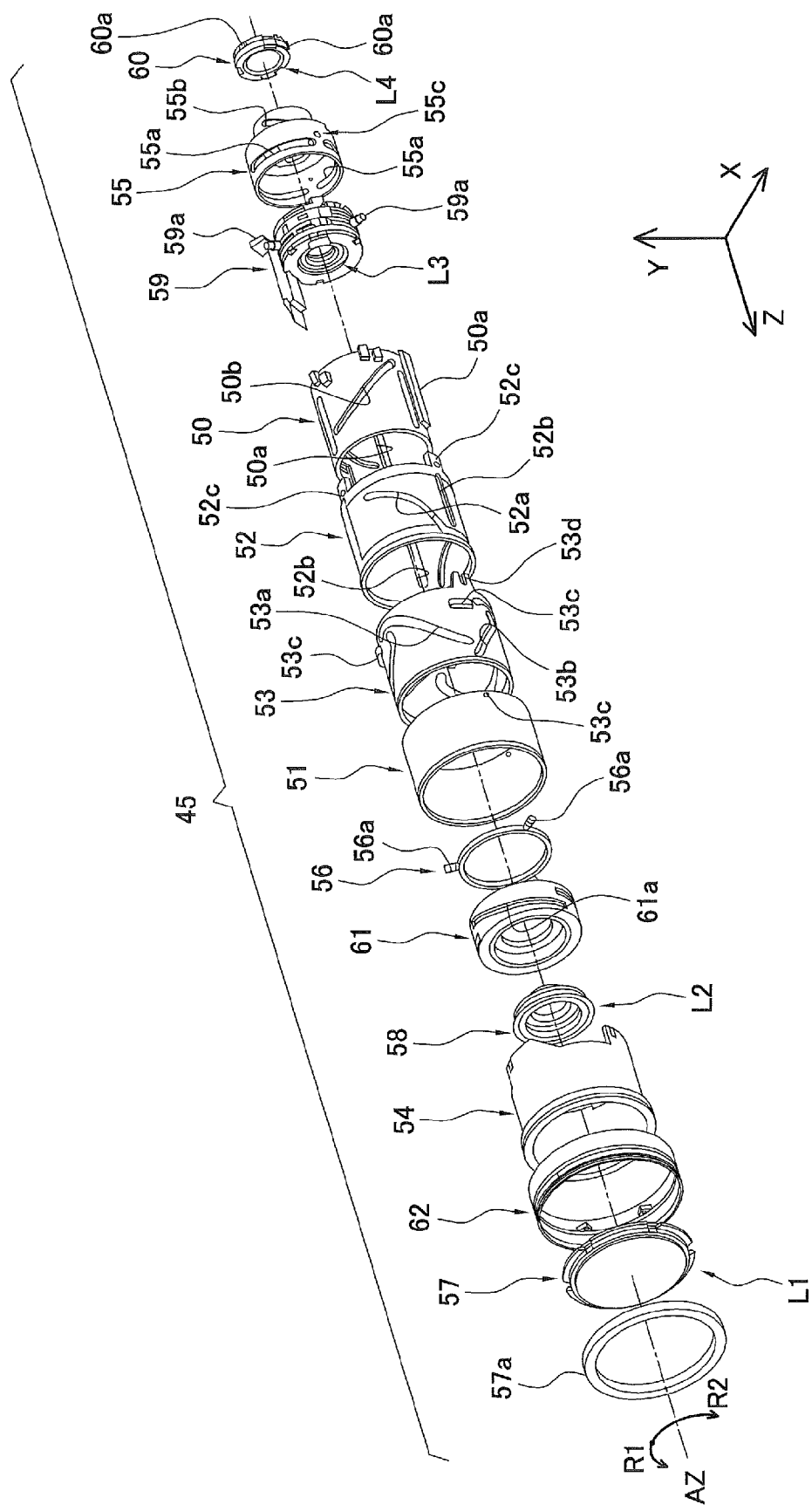
FIG. 6 is an exploded oblique view of a lens barrel.
Figure 7:
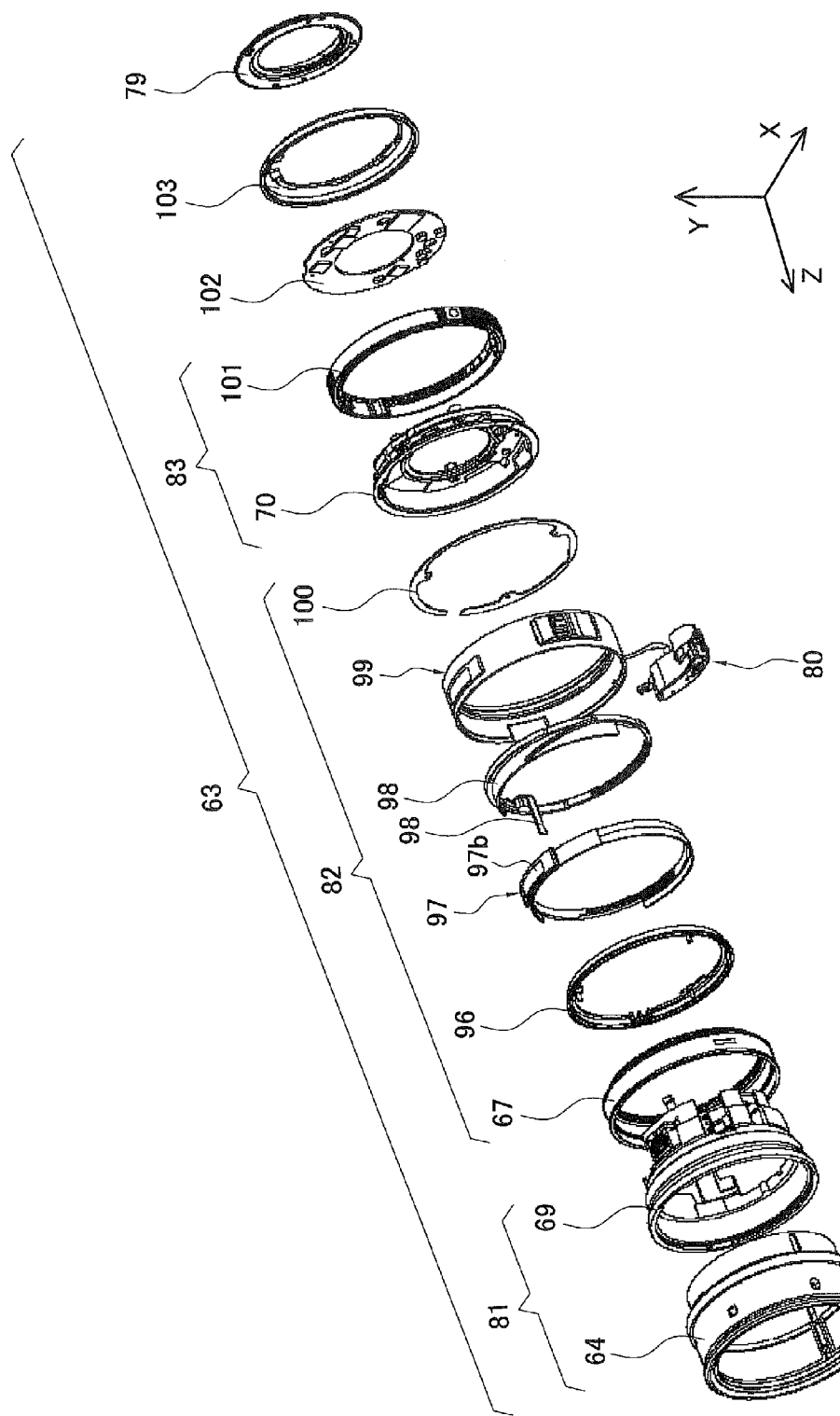
FIG. 7 is an exploded oblique view of an operation unit.

The specific configuration of the interchangeable lens unit 2 will be described through reference to FIGS. 4 to 8. As shown in FIGS. 6 and 7, an XYZ three-dimensional coordinate system is set up in which the direction along the optical axis AZ of the interchangeable lens unit 2 serves as the Z axis direction (the subject side is the positive side, and the camera body 3 side is the negative side). Herein the counter-clockwise direction is defined as the R1 direction, and the clockwise direction as the R2 direction, as viewed from the positive side in the Z axis direction.

The imaging optical system L, which has four lens groups, is installed in the interchangeable lens unit 2. More specifically, the imaging optical system L has a first lens group L1, a second lens group L2, a third lens group L3, and a fourth lens group L4. The second lens group L2 is the lens group that is used for focus adjustment.

The interchangeable lens unit 2 has a lens barrel 45 that supports the imaging optical system L, and an operating unit for operating the lens barrel 45.

The first to fourth lens groups L1 to L4 are supported movably in the Z axis direction by the lens barrel 45. More specifically, as shown in FIGS. 4 to 6, the lens barrel 45 has a fixed frame 50, a first linear frame 52, a first rotary frame 53, a first holder 54, a second rotary frame 55, a first lens support frame 57 that supports the first lens group L1, a second lens support frame 58 that supports the second lens group L2, a third lens support frame 59 that supports the third lens group L3, a fourth lens support frame 60 that supports the fourth lens group L4, a second holder 61, and a filter mount 62.

The fixed frame 50 is a member that serves as a reference for the lens barrel 45. More specifically, the fixed frame 50 has three linear through-grooves 50a and three cam though-grooves 50b. The cam pins 59a of the third lens support frame 59 (discussed below) are inserted into the linear though-grooves 50a. The cam pins of the second rotary frame 55 (not shown) are inserted into the cam though-grooves 50b. The second rotary frame 55 is guided in the axial direction by the cam though-grooves 50b when the second rotary frame 55 rotates with respect to the fixed frame 50.

The first linear frame 52 is a member that moves linearly, without rotating with respect to the fixed frame 50, and is disposed coaxially on the outer peripheral side of the fixed frame 50. More specifically, the first linear frame 52 has three cam through-grooves 52a, three linear through-grooves 52b, and three protrusions 52c. The cam pins 54a of the first holder 54 (discussed below) are inserted into the linear through-grooves 52b. Holes 52d are provided to the protrusions 52c. The cam pins 59a of the third lens support frame 59 are fitted into the holes 52d. The cam pins 59a pass through the linear through-grooves 50a of the fixed frame 50. Consequently, the first linear frame 52 moves linearly in the Z axis direction, without rotating with respect to the fixed frame 50, along with the third lens support frame 59.

The first rotary frame 53 is a member that is used for guiding the first holder 54 and the ring member 56 in the Z axis direction, and is disposed coaxially on the outer peripheral side of the first linear frame 52. The first rotary frame 53 is supported by the first linear frame 52 so as to be capable of relative rotation around the optical axis AZ. More specifically, the first rotary frame 53 has three first cam through-grooves 53a, three cam through-grooves 53b, three protrusions 53c, and a U-shaped portion 53d. The cam pins 54a of the first holder 54 (FIGS. 4 and 5) pass through the first cam through-grooves 53a and are inserted into the linear through-grooves 52b. The cam pins 56a of the ring member 56 are inserted into the linear through-grooves 53b. The protrusions 53c pass through holes 51a in the cover 51 (FIG. 6) and are inserted into linear grooves (not shown) of the zoom ring 64. Consequently, the zoom ring 64 the first rotary frame 53 and the cover 51 rotate integrally, and the first rotary frame 53 and the cover 51 are also able to move in the Z axis direction with respect to the zoom ring 64. The cam pin (not shown) of the second rotary frame 55 is fitted into the U-shaped portion 53d. Consequently, the first rotary frame 53 and the second rotary frame 55 rotate integrally and also move integrally in the Z axis direction.

The first holder 54 is a member that is used for supporting the first lens group L1, and is disposed coaxially on the outer peripheral side of the first rotary frame 53. Rotation of the first holder 54 around the optical axis AZ is limited by the first linear frame 52. More specifically, the three cam pins 54a (FIG. 4, FIG. 5) disposed at a constant pitch in the circumferential direction are provided to the portion of the first holder 54 on the negative side in the Z axis direction. The cam pins 54a extend inward in the radial direction, pass through the first cam through-grooves 53a of the first rotary frame 53, and are inserted into the linear through-grooves 52b of the first linear frame 52. Accordingly, when the first rotary frame 53 rotates around the optical axis AZ with respect to the first holder 54, the first holder 54 moves in the Z axis direction along the first cam through-grooves 53a without rotating with respect to the first linear frame 52 (while rotating with respect to the first rotary frame 53).

A first lens support frame 57 that supports the first lens group L1, a filter mount 62, and a fixed ring 57a are fixed at the end of the first holder 54 on the positive side (subject side) in the Z axis direction.

The second holder 61 is a member for supporting the second lens support frame 58, and is disposed coaxially on the inner peripheral side of the first linear frame 52. More specifically, the second holder 61 has three cam through-grooves 61a disposed at a constant pitch in the circumferential direction. The cam pins 56a of the ring member 56 pass through the cam through-grooves 61a. The cam through-grooves 61a are grooves that determine the amount of movement of the second lens group L2 (focus lens group), and are designed so that the movement of the second holder 61 in the Z axis direction conforms to the change in zoom magnification of the imaging optical system L. This means that defocusing is kept to a minimum even if the zoom magnification of the imaging optical system L should vary.

The second rotary frame 55 is a member for guiding the third lens support frame 59 and the fourth lens support frame 60 in the Z axis direction, and is disposed coaxially on the inner peripheral side of the fixed frame 50. The second rotary frame 55 has three rotary through-grooves 55a, three cam through-grooves 55b, and three cam pins 55c extending outward in the radial direction. The cam pins 59a of the third lens support frame 59 pass through the rotary through-grooves 55a. The cam pins 60a of the fourth lens support frame 60 are inserted into the cam through-grooves 55b. The cam pins 55c pass through the cam through-grooves 50b of the fixed frame 50, and are fitted into the U-shaped portion 53d of the first rotary frame 53. Accordingly, the first rotary frame 53 and the second rotary frame 55 rotate integrally and also move integrally in the Z axis direction. The amount of movement of the first rotary frame 53 and the second rotary frame 55 in the Z axis direction is determined by the cam through-grooves 50b.

The third lens support frame 59 is a member for supporting the third lens group L3, and is disposed coaxially on the inner peripheral side of the second rotary frame 55. The third lens support frame 59 has three cam pins 59a extending outward in the radial direction. The cam pins 59a pass through the rotary through-grooves 55a and the linear through-grooves 50a and are fitted into the holes 52d of the first linear frame 52. With this constitution, the first linear frame 52, the second rotary frame 55, and the third lens support frame 59 move integrally in the Z axis direction. Also, the rotation of the first linear frame 52 and the third lens support frame 59 with respect to the fixed frame 50 is limited by the cam pins 59a and the linear through-grooves 50a. Rotation of the second rotary frame 55 with respect to the fixed frame 50, the third lens support frame 59, and the first linear frame 52 is allowed by the rotary through-grooves 55a.

The fourth lens support frame 60 is a member for supporting the fourth lens group L4, and is disposed coaxially on the inner peripheral side of the second rotary frame 55. The rotation of the fourth lens support frame 60 is limited by the third lens support frame 59. More specifically, the third lens support frame 59 has three protrusions (not shown) extending to the negative side in the Z axis direction. The fourth lens support frame 60 has three grooves (not shown) extending in the Z axis direction and recessed in the radial direction. The protrusions of the third lens support frame 59 are inserted into these grooves. Consequently, the fourth lens support frame 60 is able to move in the Z axis direction with respect to the third lens support frame 59, without rotating integrally with the third lens support frame 59.

An operating unit 63 for operating the lens barrel 45 is provided on the outside in the radial direction of the lens barrel 45 described above. More specifically, as shown in FIGS. 4, 5, and 7, the operating unit 63 has a zoom ring unit 81 for adjusting the focal length, a focus ring unit 82 for adjusting the focus, and an aperture ring unit 83 for adjusting the aperture.

Figure 12:
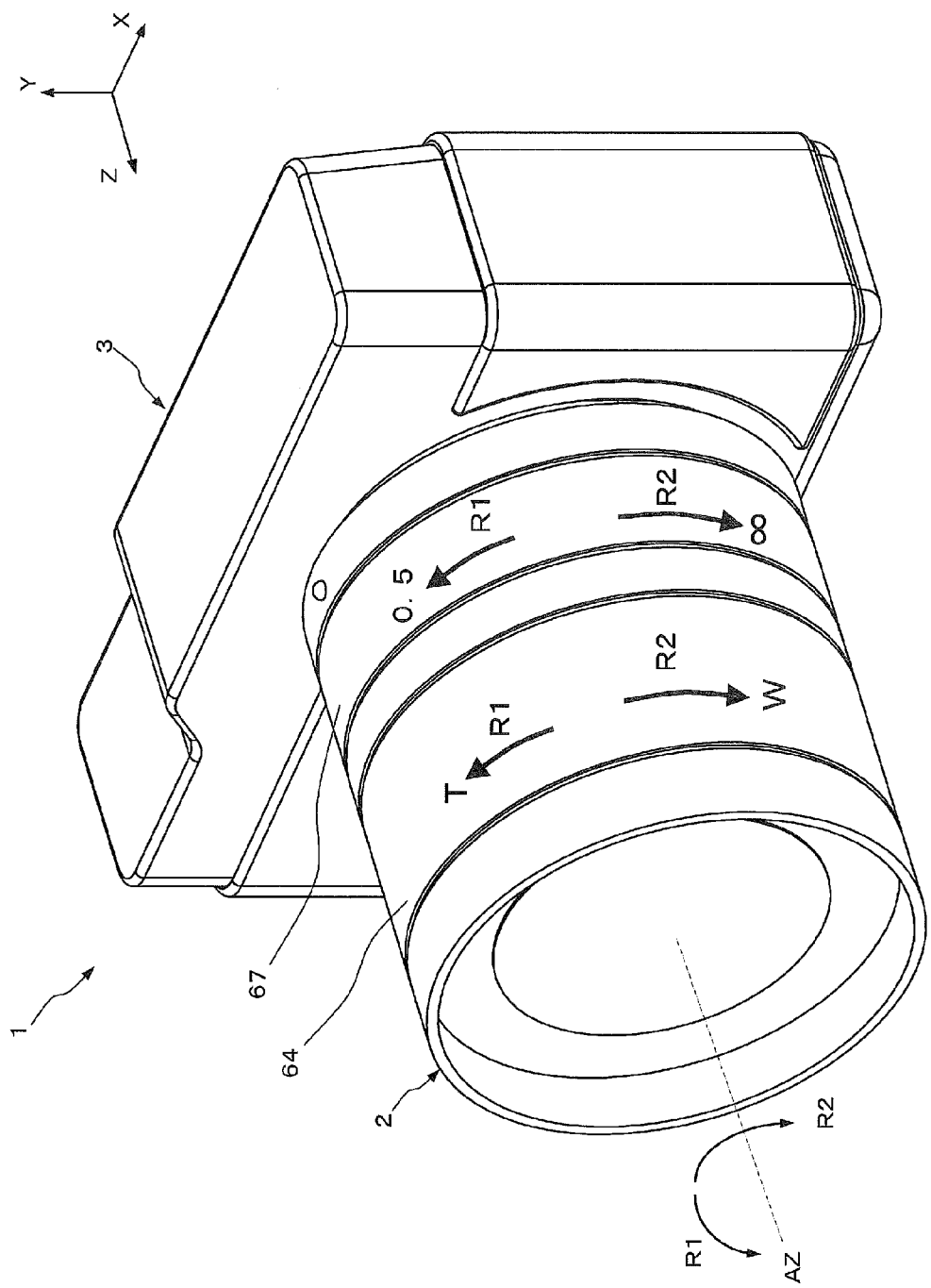
FIG. 12 is a simplified oblique view of a camera system.

The zoom ring unit 81 has a zoom ring 64 operated by the user for adjusting the focal length, and a ring base 69 that supports the zoom ring 64. The zoom ring 64 is disposed coaxially on the outer peripheral side of the cover 51, and is supported rotatably around the optical axis AZ in a state of its movement in the Z axis direction being limited by the ring base 69 fixed to the fixed frame 50. Three linear grooves (not shown) extended in the Z axis direction are formed in the inner peripheral part of the zoom ring 64. The protrusions 53c of the first rotary frame 53 are inserted into these linear grooves, so the first rotary frame 53 rotates integrally with the zoom ring 64, but is able to move relatively in the Z axis direction. The rotational angle of the zoom ring 64 with respect to the fixed frame 50 (from the telephoto end to the wide angle end) is 90 degrees, for example. In this embodiment, the R1 direction corresponds to the telephoto side, and the R2 direction to the wide angle end (FIG. 12).

A first angle detector 65 (FIG. 1) is provided to the fixed frame 50 to detect the rotational angle and rotational direction of the zoom ring 64. The first angle detector 65 detects the rotational angle of the zoom ring 64 with respect to the fixed frame 50 (the angular position of the zoom ring 64 with respect to the fixed frame 50), and outputs the detected rotational angle to the lens microcomputer 40. The lens microcomputer 40 temporarily stores the received rotational angle as first rotational angle information in the memory 44. This first rotational angle information is used in ascertaining the relative rotational angle between the ring member 56 and the second holder 61 (the positional relation between the cam pins 56a of the ring member 56 and the cam through-grooves 61a of the second holder 61), for example. The focal length of the imaging optical system L is displayed on the outer peripheral face of the zoom ring 64.

The focus ring unit 82 has a focus ring 67 operated by the user to adjust the focus, a ring guide 96, an indicator ring 97, a second holder drive ring 98, a focus fixing frame 99, and a retainer plate 100.

The focus ring 67 is disposed coaxially on the outer peripheral side of the ring base 69, and is supported rotatably around the optical axis AZ in a state in which its movement in the Z axis direction is limited by the ring base 69. A second angle detector 68 (FIG. 1) is provided to the ring base 69. The second angle detector 68 detects the rotational angle (amount of operation) and rotational direction of the focus ring 67, and outputs object point distance information to the lens microcomputer 40. With the second angle detector 68, protrusions (not shown) are formed at a constant spacing all the way around the focus ring 67. The second angle detector 68 has two photosensors (not shown). When the focus ring 67 is turned, it passes between a light emitting unit and a light receiving unit that are the constituent portions of the two photosensors, and the state in which the protrusions pass between the light emitting unit and the light receiving unit is detected. Consequently, the rotational direction and the amount of operation in the rotational direction of the focus ring 67 are detected. The second angle detector 68 outputs the amount of operation and the rotational direction to the lens microcomputer 40. The lens microcomputer 40 temporarily stores the amount of operation and the rotational direction as second rotational angle information in the memory 44. With the second angle detector 68, it is possible to detect the amount of operation of the focus ring 67, and the position in the rotational direction with respect to the fixed frame 50 cannot be detected as with the first angle detector 65. The ring guide 96, the focus fixing frame 99, and the retainer plate 100 are disposed on the negative side of the focus ring 67 in the Z axis direction.

Figure 8:
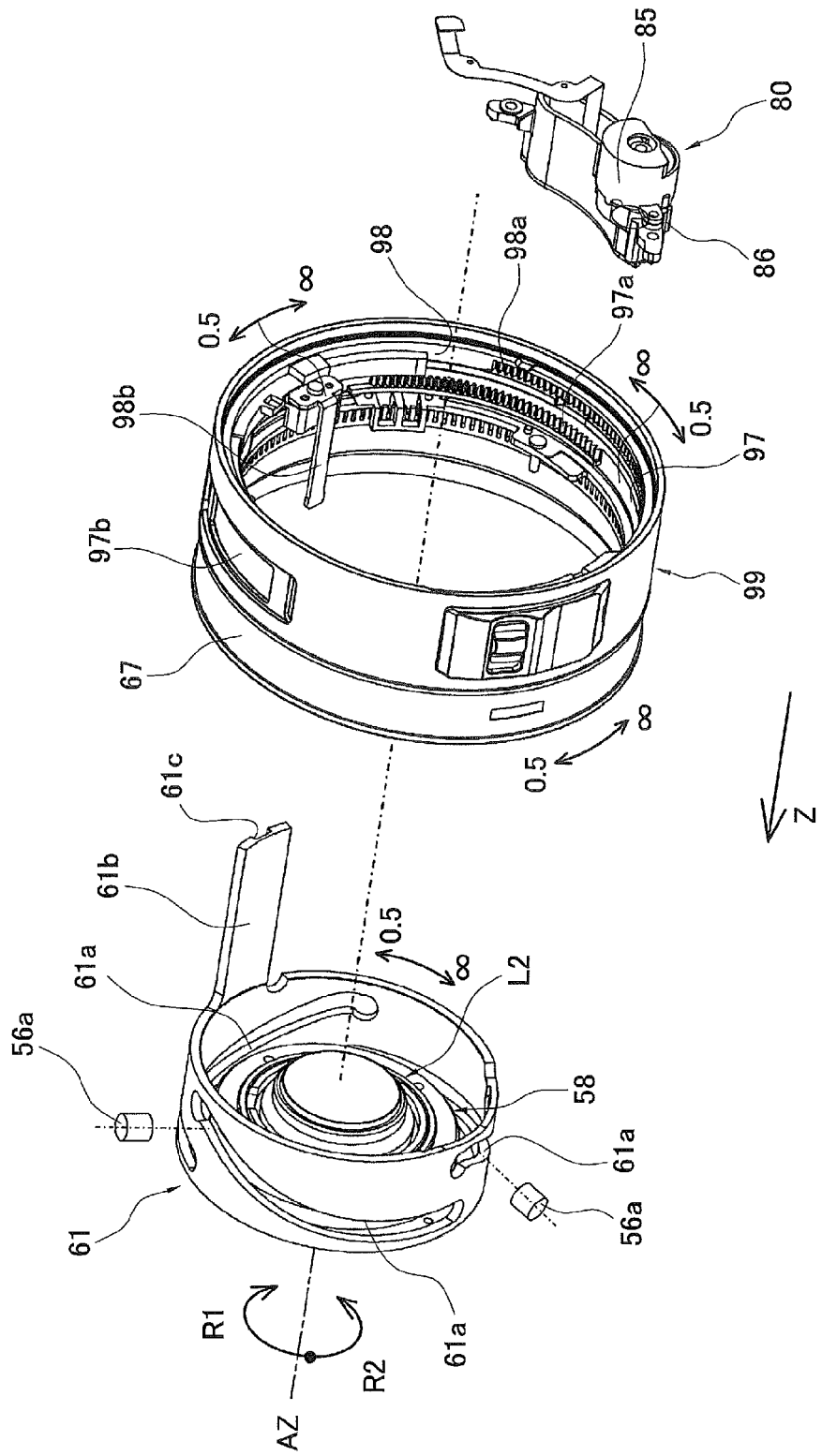
FIG. 8 is an exploded oblique view of a focus ring unit.

The focus ring unit 82 will now be described in detail through reference to FIG. 8. As shown in FIG. 8, the indicator ring 97 and the second holder drive ring 98 are rotatably disposed on the inner peripheral side of the focus fixing frame 99. The rotation of the indicator ring 97 and the second holder drive ring 98 is driven by a focus motor 80 mounted to the focus fixing frame 99.

The focus motor 80 has a motor body 85, a first drive gear 86 rotationally driven by the motor body 85, and a second drive gear (not shown) that meshes with the first drive gear 86. For the sake of quiet operation, an ultrasonic motor, for example, is used as the focus motor 80. The operation of the focus motor 80 is controlled by the focus lens drive controller 41. When the first drive gear 86 is rotationally driven by the motor body 85, the second drive gear rotates in the opposite direction from that of the first drive gear 86.

A first gear portion 98a that meshes with the first drive gear 86 is formed on the inner peripheral part of the second holder drive ring 98. A second gear portion 97a that meshes with the second drive gear is formed on the inner peripheral part of the indicator ring 97.

For example, when the second holder drive ring 98 is rotationally driven in the R1 direction by the focus motor 80, the indicator ring 97 is rotationally driven in the R2 direction, which is the opposite direction. When the user turns the focus ring 67 in the R1 direction, an indicator plate 97b on the indicator ring 97 must also be rotated in the R1 direction. Accordingly, the rotational direction of the indicator ring 97 is the same as the rotational direction of the focus ring 67, but the rotational direction of the second holder drive ring 98 is the opposite of that of the focus ring 67.

The indicator plate 97b, on which focal lengths are printed, is provided to the outer peripheral part of the indicator ring 97, and the indicator plate 97b rotates along with the drive of the focus motor 80. A clear window (not shown) in the focus fixing frame 99 is used to check the printed position of the focal length on the indicator plate 97b, which allows the user to make a rough estimate of the focal length.

A third angle detector 89, for example, is provided to the ring base 69 in order to detect the rotational angle and direction of the second holder drive ring 98. The third angle detector 89 can detect the rotational angle and rotational direction of the second holder drive ring 98 with respect to the fixed frame 50. The third angle detector 89 is similar to the first angle detector 65 in that it can detect the rotational angle of the second holder drive ring 98 with respect to the fixed frame 50. The rotational angle detected by the third angle detector 89 is outputted to the lens microcomputer 40. The lens microcomputer 40 temporarily stores this rotational angle as third rotational angle information in the memory 44.

The second holder drive ring 98 has a drive plate 98b extending to the positive side in the Z axis direction. The second holder drive ring 98 is fitted into a groove 61c in a plate portion 61b of the second holder 61. Therefore, the second holder 61 rotates integrally with the second holder drive ring 98, and is also able to move in the Z axis direction with respect to the second holder drive ring 98.

When the second holder 61 is rotationally driven by the focus motor 80 via the second holder drive ring 98, the second holder 61 rotates with respect to the ring member 56. Since the cam pins 56a of the ring member 56 pass through the cam through-grooves 61a, the second holder 61 moves in the Z axis direction with respect to the fixed frame 50 and the ring member 56 according to the shape of the cam through-grooves 61a. This allows focusing to be fine tuned.

The aperture ring unit 83 has a mount base 70 that is fixed to the fixed frame 50, and an aperture ring 101 that the user turns to adjust the aperture. The aperture ring 101 is disposed coaxially on the outer peripheral side of the mount base 70, and is rotatably supported by the mount base 70. A lens substrate 102 and a rear frame 103 are fixed to the mount base 70.

The lens mount 79 has a lens mount contact (not shown), and transmits signals between the lens microcomputer 40 and the body microcomputer 10 via the lens mount contact (not shown) of the body mount 4. The lens mount 79 is fixed to the fixed frame 50 via the mount base 70.

1.3: Focus Adjustment

The interchangeable lens unit 2 described above is compatible with contrast detection. With a contrast detection method, the second lens group L2 is moved in a direction along the optical axis AZ in order to detect the focus point, and contrast information is acquired from an image signal. This contrast information is a compilation of evaluation values at various positions of the second lens group L2, and the position of the second lens group L2 at which the evaluation value is greatest is the focus position.

More precisely, the body microcomputer 10 calculates autofocusing evaluation values (hereinafter referred to as AF evaluation values) on the basis of image data acquired by the imaging sensor 11. The AF evaluation values are found by finding a brightness signal from the image data produced by the imaging sensor 11 and integrating the high-frequency part within the screen for the brightness signal. The calculated AF evaluation values are stored, for example, in a memory 38 or DRAM (not shown) associated with an exposure synchronization signal. The lens position information acquired from the lens microcomputer 40 is also associated with an exposure synchronization signal. This lens position information can be found from the above-mentioned first and third rotational angle information. The body microcomputer 10 stores the AF evaluation values in the memory 38 so that they are associated with the lens position information. The information composed of these AF evaluation values and lens position information is the above-mentioned contrast information.

In acquiring this contrast information, it is necessary to move the second lens group L2 an extra amount in a direction along the optical axis AZ, so to achieve compatibility with the contrast detection method, the movable area of the second lens group L2 must be widened.

Figure 9:
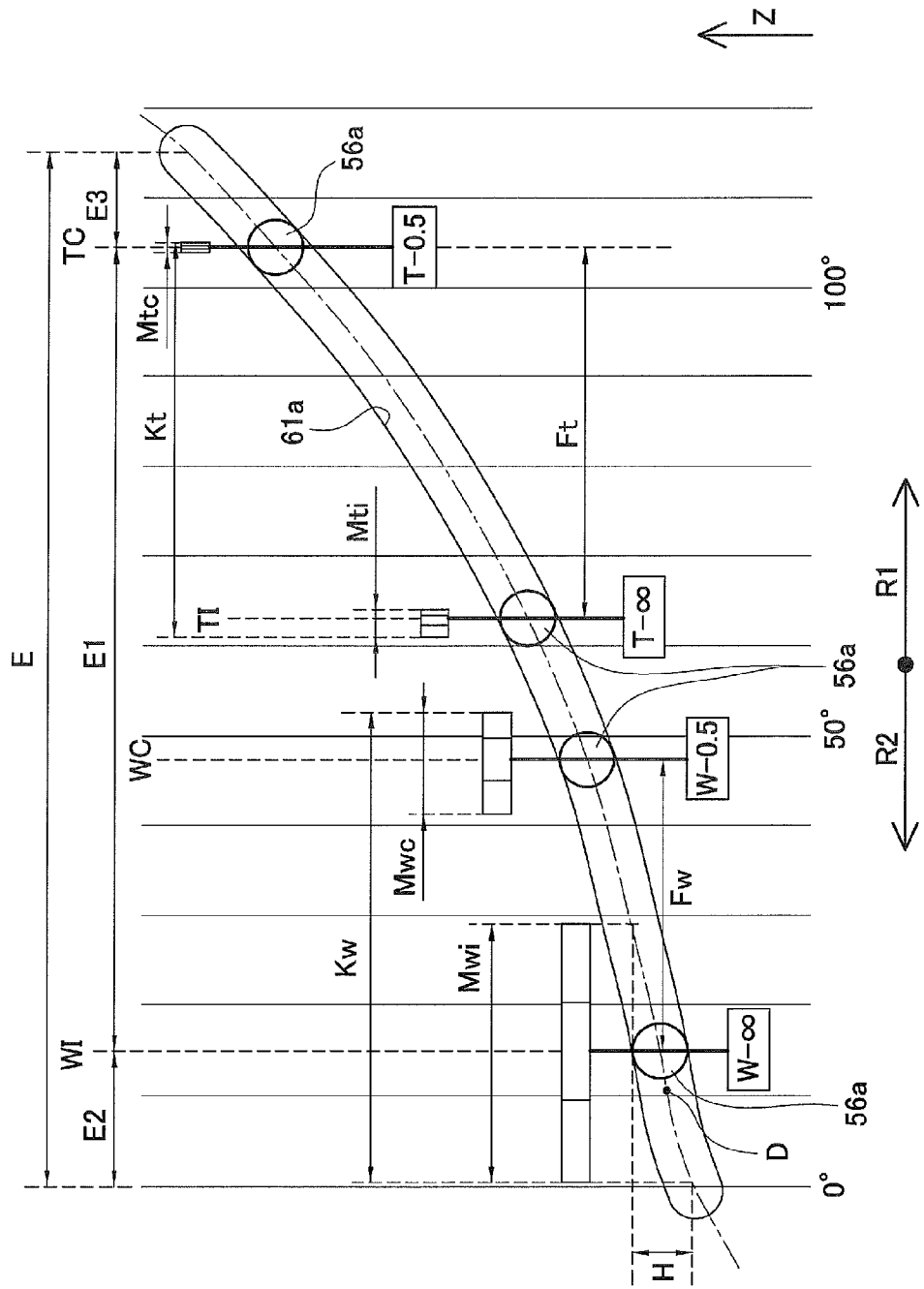
FIG. 9 is a graph of the positional relation between a cam through-groove and a cam pin.

In view of this, with this interchangeable lens unit 2, the shape of the cam through-grooves 61a of the second holder 61 is set as shown in FIG. 9. In FIG. 9, the left and right direction is the rotational direction, while the up and down direction is the direction along the optical axis AZ. The up direction corresponds to the positive side in the Z axis direction.

As shown in FIG. 9, the cam through-grooves 61a curve from the end in the R1 direction to the end in the R2 direction, and have a movable area E in which the cam pins 56a can move. The movable area E has a zoom area E1, a first surplus area E2 that extends in the R2 direction from the zoom area E1, and a second surplus area E3 that extends in the R1 direction from the zoom area E1. Here, the areas E1 to E3 are determined using the center of the cam pins 56a as a reference.

The zoom area E1 and the second surplus area E3 curve so as to lead to the negative side in the Z axis direction, and have their center on the positive side in the Z axis direction of the cam through-grooves 61a. As shown in FIG. 9, the zoom area E1 is a so-called asymptotic line. The end of the zoom area E1 in the R1 direction is the telephoto end of the imaging optical system L, and corresponds to a state of focus at the shortest imaging distance. The area from the position TC to the position TI is the range over which focus adjustment is possible at the telephoto end of the imaging optical system L. Within the range of the rotational angle Ft from the position TC to the position TI, the second holder 61 is rotationally driven by the focus motor 80. This makes focusing near the telephoto end possible.

The end of the zoom area E1 in the R2 direction (the position WI) is at the wide angle end of the imaging optical system L, and corresponds to a state of focus in which the imaging distance is infinity. The area from the position WI to the position WC is the range over which focus adjustment is possible at the wide angle end of the imaging optical system L. Within the range of the rotational angle Fw from the position WI to the position WC, the second holder 61 is rotationally driven by the focus motor 80. This makes focusing near the wide angle end possible.

The first surplus area E2 is an area used in performing focus point detection by contrast detection method, and has a portion that curves along the zoom area E1, and a portion that curves so as to lead to the positive side in the Z axis direction. Specifically, the first surplus area E2 has an inflection point D. In this embodiment, the inflection point D is disposed in the R2 direction of the position WI.

An area designed so as to satisfy a specific optical performance is basically the zoom area E1. Accordingly, in a state in which the cam pins 56a are within the first surplus area E2, it is possible that the imaging optical system L will not satisfy the specific optical performance, and this may affect the captured image. When optical performance is taken into account, the first surplus area E2 can be said to be an area that should not be used during imaging (during image acquisition).

1.4: Limitations to Drive Area of Second Holder 61

When the amount of drive during focus point detection is taken into account, the rotational angle Kw or the rotational angle Kt shown in FIG. 9, for example, is ensured as the angle at which the focus motor 80 can rotationally drive the second holder 61.

However, the drive area of the second holder 61 by the focus motor 80 must be limited to a range that is suitable for each focal length (that is, within the range of the rotational angle Fw or the rotational angle Ft). In this embodiment, as shown in FIG. 9, when the imaging optical system L is at the telephoto end, the drive area of the second holder 61 is limited to being between the position TC and the position TI. When the imaging optical system L is at the wide angle end, the drive area of the second holder 61 is limited to being between the position WI and the position WC.

Position information about the rotational direction of the second holder 61 with respect to the ring member 56 is necessary to limit this drive area. Specifically, as shown in FIG. 9, the rotational angle corresponding to the rotational angle Fw and Ft will vary according to the focal length of the imaging optical system L, so the positional relation between the cam pins 56a and the cam through-grooves 61a must be ascertained.

The positional relation between the cam pins 56a and the cam through-grooves 61a can be found on the basis of first rotational angle information about the zoom ring 64 detected by the first angle detector 65 and third rotational angle information about the second holder drive ring 98 detected by the third angle detector 89 (that is, rotational angle information about the second holder 61).

More specifically, the angle of the ring member 56 with respect to the fixed frame 50 can be found from the first rotational angle information. The angle of the second holder 61 with respect to the fixed frame 50 can be found from the third rotational angle information. Therefore, the relative rotational angle between the ring member 56 and the second holder 61 can be found, and the positional relation between the cam pins 56a and the cam through-grooves 61a can be ascertained, from the first and third rotational angle information.

For example, a table containing the first rotational angle information, the third rotational angle information, the relative rotational angle between the ring member 56 and the second holder 61, and the drive angle of the second holder 61 corresponding to the first and third rotational angle information (the rotational angle corresponding to the rotational angles RW and FT in FIG. 9, etc.) can be stored ahead of time in the memory 44 of the lens microcomputer 40. If the shape of the cam through-grooves 61a has been determined, the drive angle of the second holder 61 can be found ahead of time from the relative rotational angle between the ring member 56 and the second holder 61 (that is, the first and third rotational angle information). This table can be used to find the drive angle of the second holder 61 from the first rotational angle information detected by the first angle detector 65 and the third rotational angle information detected by the second angle detector 68. The drive angle of the second holder 61 (the amount of drive of the focus motor 80) is limited to between the shortest imaging distance and infinity by the lens microcomputer 40 via the focus lens drive controller 41 on the basis of this information about the drive angle.

However, if the drive area of the second holder 61 during focus point detection is limited as above, the movable area of the second lens group L2 during focus point detection will be narrower, so this is not compatible with the contrast detection method.

In view of this, with this camera system 1, in autofocus imaging mode, the drive angle of the second holder 61 is increased over that in manual imaging mode to change the drive angle of the second holder 61 (movable area of the second lens group L2).

More specifically, the above-mentioned table stored in the memory 44 further contains the required drive angle of the second holder 61 during focus point detection. This required drive angle is found ahead of time from the shape of the cam through-grooves 61a and the detected drive distance H (FIG. 9) of the second lens group L2 during focus point detection. For instance, near the position WI, the slope of the cam through-grooves 61a is small, so the rotational angle Mwi corresponding to the detected drive distance H is greater than the rotational angle Mwc at the position WC, the rotational angle Mti at the position TI, and the rotational angle Mtc at the position TC. Thus, the required drive angle of the second holder 61 can be found from the positional relation between the cam pins 56a and the cam through-grooves 61a (that is, the first and third rotational angle information).

The maximum drive angle K corresponding to the first and third rotational angle information is determined on the basis of the required drive angle during focus point detection. In autofocus imaging mode, the drive angle of the second holder 61 is limited by the lens microcomputer 40 within the range of the maximum drive angle K.

As described above, with this camera system 1, in order to achieve compatibility with the contrast detection method, the limitation range of the drive angle of the second holder 61 is varied between the manual imaging mode and the autofocus imaging mode.

In manual imaging mode, since the drive angle of the second holder 61 is limited to within the range of the rotational angle F, although there is some positional deviation due to dimensional error of the various components, basically the cam pins 56a move only through the zoom area E1 of the cam through-grooves 61a. Accordingly, imaging can be prevented in the first surplus area E2 in which good optical performance cannot be guaranteed.

Also, in manual imaging mode, since the second holder 61 is not rotated to the first surplus area E2, this prevents any major deviation in the focal length printed position on the indicator plate 97b of the indicator ring 97.

2: Operation of Camera System

The imaging operation of the camera system 1 constituted as above will now be described.

Figure 10:
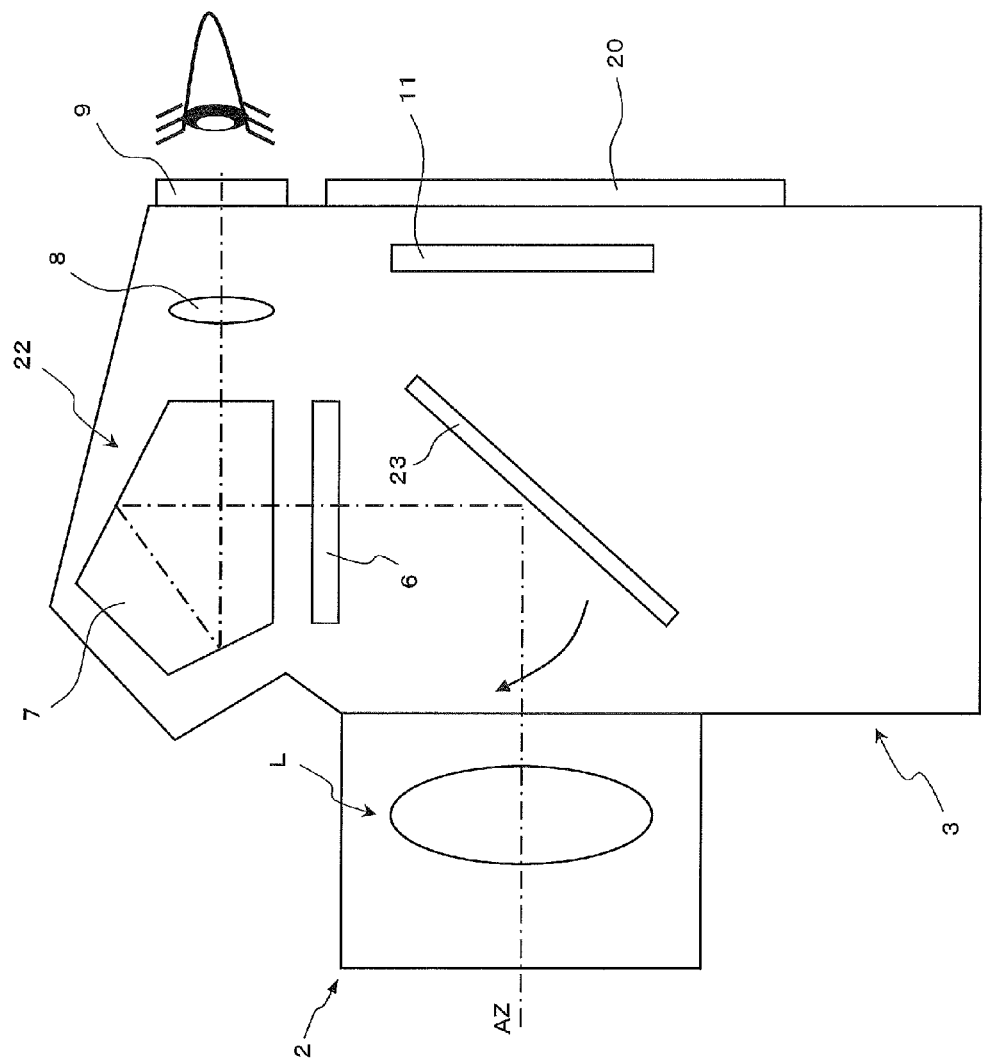
FIG. 10 is a diagram illustrating viewfinder imaging mode.
Figure 11:
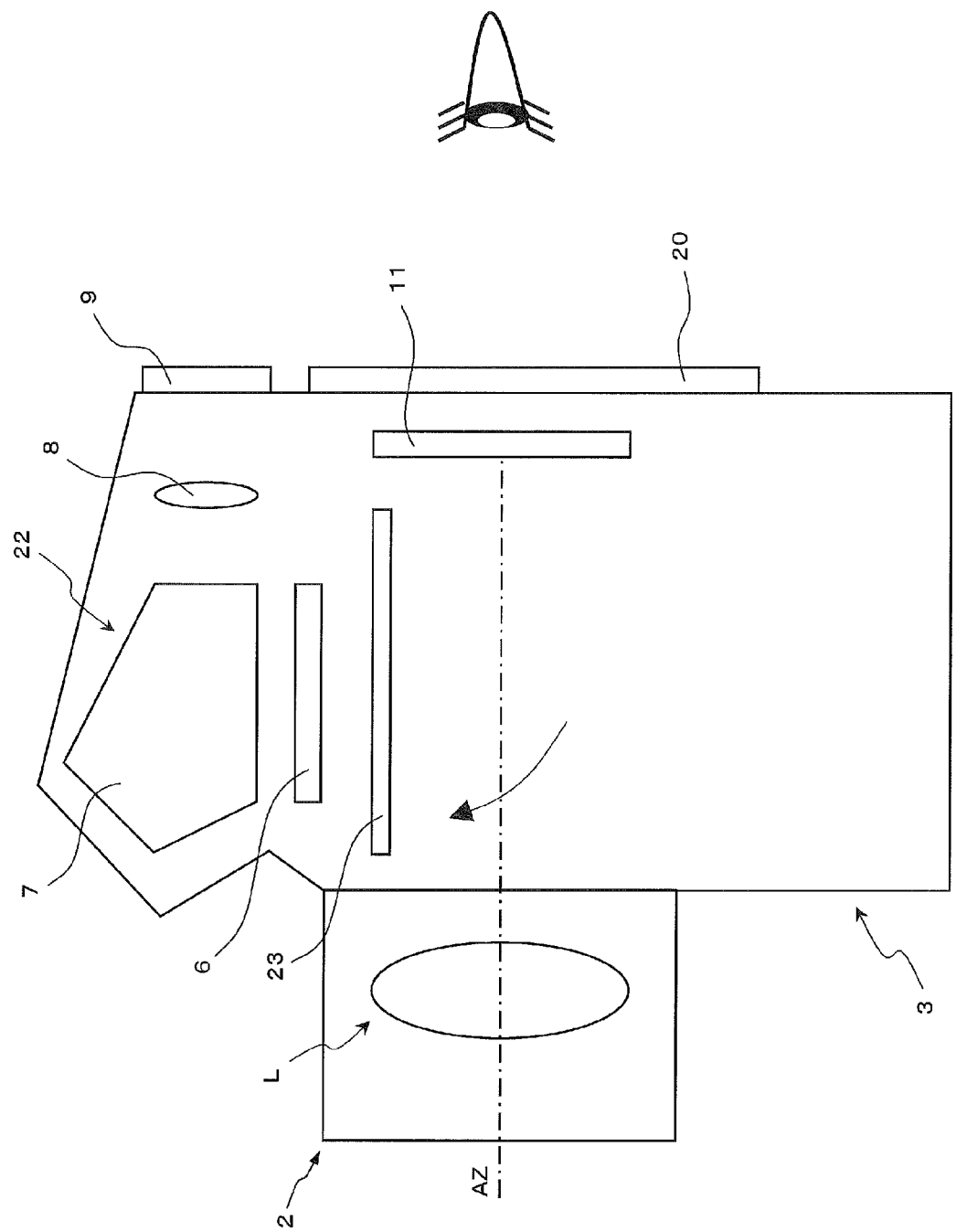
FIG. 11 is a diagram illustrating monitor imaging mode.

FIGS. 10 and 11 are concept diagrams of during imaging with the camera system 1. FIG. 10 is a diagram illustrating viewfinder imaging mode, and FIG. 11 is a diagram illustrating monitor imaging mode.

2.1: State Prior to Imaging

As shown in FIGS. 10 and 11, light from the subject (not shown) passes through the interchangeable lens unit 2 and is incident on the main mirror 23a, which is a semi-transmitting mirror. Part of the light incident on the main mirror 23a is reflected and incident on the viewfinder screen 6, and the rest of the light is transmitted and incident on the sub-mirror 23b. Light incident on the viewfinder screen 6 forms a subject image. This subject image is converted into an erect image by the pentaprism 7 and incident on an eyepiece lens 8. Consequently, the user can view an erect image of the subject through the viewfinder eyepiece window 9. Light that is incident on the sub-mirror 23b is reflected and incident on the focus point detection unit 5.

2.2: Viewfinder Imaging Mode and Monitor Imaging Mode

This camera system 1 has two imaging modes, namely, a viewfinder imaging mode and a monitor imaging mode. The viewfinder imaging mode is a mode in which the user captures a picture while looking through the viewfinder eyepiece window 9. This is the normal imaging mode in a conventional single lens reflex camera. The monitor imaging mode is a mode in which the user captures a picture while looking at the display unit 20, which is a liquid crystal monitor or the like.

In the viewfinder imaging mode, as shown in FIG. 10, the quick return mirror 23 is disposed at a specific location within the optical axis AZ, and the subject light is guided to the viewfinder optical system 22, so the user can view the subject image through the viewfinder eyepiece window 9. During actual imaging, the quick return mirror 23 is flipped up outside of the optical axis AZ, and the shutter unit 33 is opened, which forms a subject image on the image face of the imaging sensor 11.

Meanwhile, in monitor imaging mode, as shown in FIG. 11, the quick return mirror 23 is retracted out of the optical axis AZ. Thus, a through image of the subject (a so-called live view image) is displayed on the display unit 20 via the imaging sensor 11.

2.3: Operation in Viewfinder Imaging Mode

The imaging operation of the camera system 1 will be described. The drive sequence in viewfinder imaging mode in which the user looks through the viewfinder eyepiece window 9 to capture a picture will be described through reference to FIGS. 1 to 4.

When an image is to be captured in viewfinder imaging mode, the user presses the viewfinder switching button 34 provided to the rear face of the case 3a to select the viewfinder imaging mode as the imaging mode.

When the user presses the release button 30 half way down, power is supplied to the body microcomputer 10 and the various units in the camera system 1. The body microcomputer 10 in the camera system 1 that has been actuated by the supply of power receives various kinds of lens data from the lens microcomputer 40 in the interchangeable lens unit 2, which is similarly actuated by the supply of power, through the lens mount 79 and the body mount 4, and this information is stored in the built-in memory 38. Next, the body microcomputer 10 acquires the amount of defocus (hereinafter referred to as the Df amount) from the focus point detection unit 5, and sends a command to the lens microcomputer 40 to drive the focus lens 24 by this Df amount. The lens microcomputer 40 controls the focus lens drive controller 41 and operates the second lens group L2 by the Df amount. While focus point detection and drive of the second lens group L2 are thus repeated, the Df amount decreases, and when it reaches a specific amount or less, the body microcomputer 10 decides that the image is in focus, and drive of the second lens group L2 is stopped.

After this, when the user presses the release button 30 all the way down, the body microcomputer 10 instructs the lens microcomputer 40 to set the aperture value to the one calculated on the basis of the output from a photometer sensor (not shown). The lens microcomputer 40 then controls the aperture drive controller 42 and stops down the aperture to the indicated aperture value. Simultaneously with this aperture value command, the body microcomputer 10 retracts the quick return mirror 23 from within the optical axis AZ with the quick return mirror controller 36. Once the quick return mirror 23 has been completely retracted, the imaging sensor drive controller 12 directs the imaging sensor 11 to be driven, and directs the shutter unit 33 to be operated. The imaging sensor drive controller 12 also exposes the imaging sensor 11 for the time of the shutter speed calculated on the basis of the output from a photometer sensor (not shown).

Upon completion of the exposure, the image data read by the imaging sensor drive controller 12 from the imaging sensor 11 is subjected to specific image processing, after which it is displayed as a captured image on the display unit 20. The image data that has been read from the imaging sensor 11 and subjected to the specific image processing is written via the image recorder 18 as image data to a storage medium. Also, upon the completion of exposure, the quick return mirror 23 and the shutter unit 33 are reset to their initial positions. The body microcomputer 10 directs the lens microcomputer 40 to reset the aperture to its open position, and the lens microcomputer 40 issues a reset command to the various units. Upon completion of the resetting, the lens microcomputer 40 conveys the resetting completion to the body microcomputer 10. The body microcomputer 10 awaits the completion of the series of processing after exposure and the resetting completion information from the lens microcomputer 40, after which it is confirmed that the release button 30 has not been pressed, and the imaging sequence is ended.

2.4: Operation in Monitor Imaging Mode

The drive sequence in monitor imaging mode, in which the user uses the display unit 20 to capture an image, will now be described through reference to FIGS. 1 to 3B and FIG. 5.

When the display unit 20 is used for imaging, the user presses the viewfinder switching button 34 to select the monitor imaging mode. When the monitor imaging mode is set, the body microcomputer 10 retracts the quick return mirror 23 from within the optical axis AZ. Consequently, light from the subject reaches the imaging sensor 11. The imaging sensor 11 converts light from the subject that has been imaged on the imaging sensor 11 into image data, and the image data thus acquired can be outputted. The image data read from the imaging sensor 11 by the imaging sensor drive controller 12 undergoes specific image processing, after which it is displayed as a captured image on the display unit 20. Thus displaying the captured image on the display unit 20 allows the user to follow the subject without having to look through the viewfinder eyepiece window 9.

Regarding this monitor imaging mode, when the moving picture imagine mode has been selected with the mode switching dial 26, there is an automatic switch to monitor imaging mode. Furthermore, there is an automatic switch to monitor imaging mode when the moving picture imaging button 35 has been pressed.

In this monitor imaging mode, contrast detection-type autofocusing, which is based on image data produced by the imaging sensor 11, is used as the focusing method instead of a phase difference detection method in which the focus point detection unit 5 is used. When a contrast detection method is used as the method for autofocusing in the monitor imaging mode with the display unit 20, precise focusing can be achieved with the camera system. In this monitor imaging mode, autofocusing by the contrast detection method in which image data is used is easier than a conventional phase difference detection method since image data is produced by the imaging sensor 11 in a steady state.

The autofocusing operation by contrast detection method will now be described.

When performing autofocusing by contrast detection method, the body microcomputer 10 requests contrast AF data from the lens microcomputer 40. This contrast AF data is necessary in autofocusing by contrast detection method, and includes, for example, the focus drive speed, the amount of focus shift, the zoom ratio, and whether or not contrast autofocus is possible.

The body microcomputer 10 periodically produces a vertical synchronization signal. The body microcomputer 10 produces an exposure synchronization signal in parallel with this on the basis of the vertical synchronization signal. This allows an exposure synchronization signal to be produced because the body microcomputer 10 ascertains ahead of time the exposure start and end timing, using the vertical synchronization signal as a reference. The body microcomputer 10 outputs the vertical synchronization signal to a timing generator (not shown), and outputs the exposure synchronization signal to the lens microcomputer 40. The lens microcomputer 40 synchronizes with the exposure synchronization signal and acquires position information about the second lens group L2.

The imaging sensor drive controller 12 periodically produces an electronic shutter drive signal and the read signal of the imaging sensor 11 on the basis of the vertical synchronization signal. The imaging sensor drive controller 12 drives the imaging sensor 11 on the basis of the electronic shutter drive signal and the read signal. Specifically, the imaging sensor 11 reads to a vertical transfer part (not shown) the image data produced by numerous opto-electrical conversion elements (not shown) present in the imaging sensor 11, according to the read signal.

In still picture imaging mode, the user presses the release button 30 half-way down, and the body microcomputer 10 of the camera system 1 receives various kinds of lens data from the lens microcomputer 40 in the interchangeable lens unit 2 via the lens mount 79 and the body mount 4, and this data is stored in the built-in memory 38. Also, the body microcomputer 10 sends an autofocus start command to the lens microcomputer 40. When the release button 30 is pressed down half-way, the autofocus start command is a command to start the autofocusing operation by contrast detection method. On the basis of this command, the lens microcomputer 40 controls the operation of the focus motor 80 via the focus lens drive controller 41 so that the second lens group L2 moves in the direction along the optical axis AZ.

As discussed above, the body microcomputer 10 acquires contrast information on the basis of the received image data. The body microcomputer 10 finds the contrast peak on the basis of this contrast information, and monitors whether or not the focus point has been selected. More specifically, the position of the second lens group L2 at which the AF evaluation value is its maximum value is selected as the focus point. This lens drive method is commonly known as a mountain climbing method.

With this mountain climbing method, as mentioned above, it is necessary to move the second lens group L2 close to the focus position during focus point detection. Accordingly, as shown in FIG. 9, at the position WI, the cam through-grooves 61a and the cam pins 56a move relatively within the range of the rotational angle Mwi. In other words, as discussed above, the rotational angle of the second holder 61 is limited by the lens microcomputer 40 to within the range of the rotational angle Mwi. As a result, the cam pins 56a move within the first surplus area E2 during focus point detection, but at the edge of the first surplus area E2 the cam through-grooves 61a and the cam pins 56a come into contact, preventing the rotation of the second holder 61 from being hindered.

Thus providing the first surplus area E2 on the outside of the zoom area E1 ensures an area in which the cam pins 56a can move during focus point detection. Also, limiting the rotational angle of the second holder 61 prevents the rotation of the second holder 61 from being hindered.

The same applies to the position TC, but since the slope angle of the cam through-grooves 61a is greater in the case of the position TC, the rotational angle Mtc is narrower than at the position WI, and therefore it is unnecessary for the second surplus area E3 to be as large as the first surplus area E2.

Also, optical performance tends to be lower in the first surplus area E2 than in the zoom area E1. Accordingly, it is exceedingly unlikely that the focus position will be within the range of the first surplus area E2, which means that the rotational angle of the second holder 61 will be limited only within the range of the angle Mwi, but there is no possibility that the first surplus area E2 will be used during image acquisition.

Furthermore, the first surplus area E2 curves so that it has an inflection point outside the position WI and leads to the positive side in the Z axis direction, so the slope of the first surplus area E2 can be set high, and the rotational angle Mwi can be set low. This prevents the lens barrel 45 from being too large, while still affording compatibility with the contrast detection method.

Upon completion of the focus point detection, if the user presses the release button 30 all the way down, the body microcomputer 10 instructs the lens microcomputer 40 to set the aperture value to the one calculated on the basis of the output from a photometer sensor (not shown). The lens microcomputer 40 then controls the aperture drive controller 42 and stops down the aperture to the indicated aperture value. The imaging sensor drive controller 12 directs the imaging sensor 11 to be driven, and directs the shutter unit 33 to be operated. The imaging sensor drive controller 12 also exposes the imaging sensor 11 for the time of the specific shutter speed calculated on the basis of the output from the imaging sensor 11.

Upon completion of the exposure, the image data read from the imaging sensor 11 by the imaging sensor drive controller 12 is subjected to specific image processing, after which it is displayed as a captured image on the display unit 20. Also, the image data read from the imaging sensor 11 and subjected to the specific image processing is written via the image recorder 18 as image data to a storage medium. Also, upon completion of exposure, the quick return mirror 23 is positioned in a state of being retracted from within the optical axis AZ, so the user can use the monitor imaging mode to view the subject as a captured image on the display unit 20.

Similarly, in moving picture imaging mode, a moving picture can be recorded if the user presses the release button 30 all the way down. Regardless of what the mode is, moving picture recording can be performed if the user presses the moving picture imaging button 35 all the way down. Furthermore, if the interchangeable lens unit 2 is compatible with moving picture imaging, the design may be such that the mode automatically switches to moving picture imaging mode when the interchangeable lens unit 2 is attached to the camera body 3.

When the monitor imaging mode is to be exited, the user presses the viewfinder switching button 34 to change the system to the viewfinder imaging mode in which the subject is viewed through the viewfinder eyepiece window 9. When the mode changes to viewfinder imaging mode, the quick return mirror 23 is returned to its specific position within the optical axis AZ. The quick return mirror 23 is also returned to its specific position within the optical axis AZ when the power to the camera system 1 is switched off.

2.5: Zooming

The operation of the interchangeable lens unit 2 when the user performs zooming and focusing will now be described.

As shown in FIGS. 4 to 7, when the user turns the zoom ring 64, this turning motion is transmitted to the first rotary frame 53 linked to the zoom ring 64. When the first rotary frame 53 rotates around the optical axis AZ, the cam pins 55c fitted into the U-shaped portion 53d of the first rotary frame 53 are guided by the cam though-grooves 50b of the fixed frame 50, and the first rotary frame 53 moves along with the second rotary frame 55 in the Z axis direction while rotating around the optical axis AZ with respect to the fixed frame 50. Since the cam pins 59a of the third lens support frame 59 fitted into the holes 52d pass through the rotary through-grooves 55a and the linear through-grooves 50a, the first linear frame 52 integrally moves with the first rotary frame 53, the second rotary frame 55, and the third lens support frame 59 linearly in the Z axis direction without rotating with respect to the fixed frame 50 (while rotating with respect to the first rotary frame 53). The amount of movement of the first linear frame 52, the first rotary frame 53, the second rotary frame 55, and the third lens support frame 59 in the Z axis direction with respect to the fixed frame 50 is determined by the shape of the cam through-grooves 50b.

When the first rotary frame 53 rotates along with the zoom ring 64 around the optical axis AZ with respect to the fixed frame 50, the cam pins 54a are guided by the first cam through-grooves 53a, and the first holder 54 and the first lens support frame 57 move in the Z axis direction with respect to the first rotary frame 53. Here, because of the cam pins 54a and the linear through-grooves 52b, the first holder 54 and the first lens support frame 57 do not rotate with respect to the fixed frame 50. The amount of movement of the first holder 54 and first lens support frame 57 in the Z axis direction is determined by the shape of the first cam through-grooves 53a and the amount of movement of the first rotary frame 53.

When the first rotary frame 53 rotates around the optical axis AZ with respect to the fixed frame 50, the cam pins 56a of the ring member 56 are guided by the cam through-grooves 52a and the cam through-grooves 53b, and the ring member 56 moves in the Z axis direction while rotating with respect to the fixed frame 50. The rotational angle of the ring member 56 and its amount of movement in the Z axis direction are determined by the shape of the cam through-grooves 53b and the cam through-grooves 52a. More specifically, when the rotational angle of the zoom ring 64 with respect to the fixed frame 50 is 90 degrees from the telephoto end to the wide angle end, the rotational angle of the ring member 56 with respect to the fixed frame 50 is two-thirds of that, or 60 degrees.

If the ring member 56 moves in the Z axis direction while rotating with respect to the fixed frame 50, since the cam pins 56a pass through the cam through-grooves 61a, the second holder 61 and the second lens support frame 58 move integrally in the Z axis direction. Here, since the drive plate 98b of the second holder drive ring 98 is inserted in the Z axis direction into the groove 61c of the plate portion 61b, the rotation of the second holder 61 and the second lens support frame 58 with respect to the fixed frame 50 is limited. The amount of movement of the second holder 61 in the Z axis direction is determined by the shape of the cam through-grooves 61a and the amount of movement of the ring member 56.

As discussed above, when the zoom ring 64 is rotated toward the telephoto side (the R1 direction), the state of the interchangeable lens unit 2 (more precisely, the state of the lens barrel 45) changes from the wide angle end state shown in FIG. 4 to the telephoto end state shown in FIG. 5, and the lens groups L1 to L4 move in a direction along the optical axis AZ. Consequently, the focal length of the imaging optical system L changes to the focal length set with the zoom ring 64, and it is possible to capture an image at the desired zoom position.

Here, as the zoom ring 64 rotates, the second holder 61 and the second lens support frame 58 move in a direction along the optical axis AZ with respect to the fixed frame 50 so that the focus state does not change. Consequently, in a state of being focused at infinity, even if the focal length of the imaging optical system L is changed, or there is a change from the wide angle end to the telephoto end, or from the telephoto end to the wide angle end, for example, the focus state at infinity will be maintained. Also, in a state of being focused at a short distance of 0.5 m, for example, even if the focal length of the imaging optical system L is changed from the wide angle end to the telephoto end, or from the telephoto end to the wide angle end, the focus state at a short distance will be maintained.

2.6: Manual Imaging Mode

However, because of dimensional error of the components, etc., it may be difficult to maintain the focus state perfectly, and as the focal length changes, the actual focus position may change slightly. The user may also intentionally shift the focus when capturing an image.

In view of this, in a case such as this, imaging is performed in manual imaging mode, in which the user can adjust the focus manually.

In this manual imaging mode, when the user turns the focus ring 67, the second holder 61 is rotationally driven by the focus motor 80 on the basis of the imaging distance set with the focus ring 67. More specifically, when the user operates the focus ring 67 in its rotational direction, the amount of operation of the focus ring 67 is detected by the second angle detector 68, and the second angle detector 68 outputs a signal corresponding to this operation amount. The lens microcomputer 40 produces a drive signal for driving the focus motor 80 on the basis of the operation amount signal, and this drive signal is sent from the lens microcomputer 40 to the focus lens drive controller 41. The focus lens drive controller 41 drives the focus motor 80 on the basis of the drive signal. The second holder 61 is rotated up to the set angle by the focus motor 80.

Here, if the cam pins 56a move up to the first surplus area E2 of the second holder 61, there is the possibility that the desired optical performance will not be satisfied in the first surplus area E2, so there is the possibility of problems with picture quality and so forth when an image is acquired in a state in which the cam pins 56a are stopped within the first surplus area E2.

However, with this camera system 1, in manual imaging mode, the drive angle of the second holder 61 is limited to within the range of the rotational angle F as discussed above, so the movement range of the cam pins 56a is limited to within the zoom area E1. Consequently, this prevents the first surplus area E2 from being used for focus point detection in manual imaging mode.

3: Features of Camera System

The features of the camera system 1 are as follows.

(1)

With this camera system 1, the movable area of the second lens group L2 can be varied between the autofocus imaging mode and the manual imaging mode. More specifically, as shown in FIG. 9, in autofocus imaging mode, the operation of the focus motor 80 is controlled by the lens microcomputer 40 via the focus lens drive controller 41 so that the drive angle of the second holder 61 will be limited to the rotational angle K (such as the rotational angle Kw or the rotational angle Kt). This prevents the cam pins 56a from coming into contact with the ends of the cam through-grooves 61a during focus point detection.

Also, in manual imaging mode, the operation of the focus motor 80 is controlled by the lens microcomputer 40 via the focus lens drive controller 41 so that the drive angle of the second holder 61 will be limited to the rotational angle F (such as the rotational angle Fw or the rotational angle Ft). This prevents the first surplus area E2 from being used during imaging for focus point detection.

Thus, with this camera system 1, compatibility with a contrast detection method can be obtained by varying the range over which the drive angle of the second holder 61 is limited in both modes.

(2)

With this camera system 1, an inflection point D is provided to the first surplus area E2 for focus point detection, and the slope of the first surplus area E2 is set larger than that at the position WI of the zoom area E1. Accordingly, the length of the first surplus area E2 can be reduced, and the lens barrel 45 can be prevented from becoming larger while still allowing the use of a contrast detection method. Specifically, this prevents the camera system 1 and the interchangeable lens unit 2 from becoming larger.

Also, since the first surplus area E2 has a large slope, optical performance decreases in the first surplus area E2 as compared to that at the position WI. Accordingly, this prevents the focus position from being in the first surplus area E2 during focus point detection, and prevents the first surplus area E2 for focus point detection from being used during imaging even in autofocus imaging mode.

Other Embodiments

Embodiments of the present invention are not limited to the embodiment given above, and various modifications and changes are possible without departing from the gist of the invention.

(1)

Figure 13:
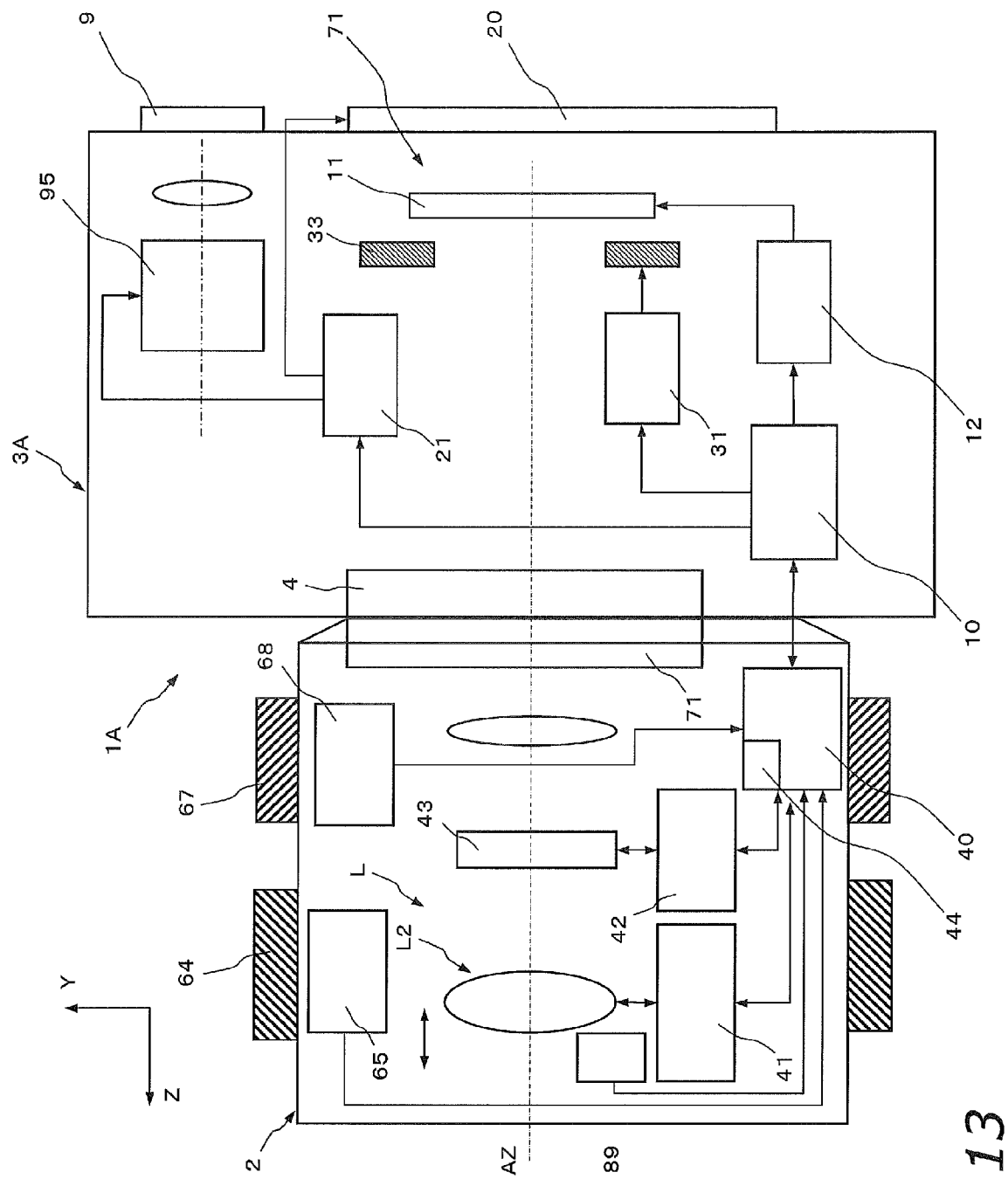
FIG. 13 is a block diagram of the constitution of a camera system (other embodiment).

In the first embodiment, the quick return mirror 23 was used, but if focusing is possible by contrast detection method, then the quick return mirror 23 can be eliminated. A camera system 1A according to a second embodiment will be described through reference to FIG. 13. FIG. 13 is a block diagram of the constitution of a camera system 1A. Components that have substantially the same function as those shown in FIG. 1 will be numbered the same and not described again.

In FIG. 13, the camera system 1A is an interchangeable lens type of digital camera system, and is made up primarily of a camera body 3A having the main functions of the camera system 1A, and an interchangeable lens unit 2 that is removably mounted to the camera body 3A. The interchangeable lens unit 2 is mounted to a body mount 4 provided to the front face of the camera body 3A via a lens mount 79 provided at the rearmost part.

The camera body 3A shown in FIG. 13 differs from the camera body 3 shown in FIG. 1 in that it does not have the quick return mirror 23 that guides incident light from the imaging part 71 to the viewfinder optical system 22 and the focus point detection unit 5, and in its place, there is provided an electronic viewfinder 95, such as a liquid crystal viewfinder. An image signal recorded to the buffer memory 16 or the image recorder 18 can be displayed as a visible image on this electronic viewfinder 95 on the basis of a command from the image display controller 21, just as with the display unit 20. Consequently, even though the quick return mirror 23 is not installed, an optical image of the subject formed by the imaging optical system L can be viewed through the viewfinder eyepiece window 9.

Here again, the same effect as in the above embodiment is obtained.

(2)

In this embodiment, an ultrasonic motor was used as the actuator for focus adjustment, but it may instead be another type of actuator, such as a stepping motor.

(3)

In this embodiment, the focus lens was the second lens group L2, but is not limited to this, and may instead be another lens group, such as the third lens group L3 or the fourth lens group L4. Also, a case in which there was only one second lens group L2 as the focus lens was described, but the present invention can also be applied to an optical system that performs focusing by cooperation among a plurality of lens groups.

INDUSTRIAL APPLICABILITY

Because the camera system and interchangeable lens are constituted as above, they are compatible with a contrast detection method. Therefore, the camera system and interchangeable lens discussed above can be used with the contrast detection method, making them useful in the field of digital cameras with an interchangeable lens.

The invention claimed is:

1. A camera system, comprising:
an interchangeable lens having an imaging optical system that has a focus lens and that forms an optical image of a subject, a lens barrel configured to support the imaging optical system and having a focus lens support frame supporting the focus lens movably in a direction along the optical axis, a focus driver configured to drive the focus lens support frame, an information input part with which position information about the focus lens can be inputted, and a lens controller configured to control the operation of the focus driver; and
a camera body having an imaging part configured to convert an optical image into an image signal, a contrast information acquisition part configured to acquire contrast information for focus point detection on the basis of the image signal, and a body controller configured to control the operation of the imaging part and the contrast information acquisition part and with which information can be exchanged with the lens controller,
when the focus lens support frame is driven by the focus driver on the basis of the contrast information, the lens controller configured to move the focus lens via the focus driver within a movable area, the movable area having a zoom area corresponding to from the wide angle end of the imaging optical system to the telephoto end, and a surplus area used during focus point detection and provided outside of the zoom area,
when the focus lens support frame is driven by the focus driver on the basis of the position information inputted to the information input part, the lens controller configured to move the focus lens via the focus driver only within the zoom area,
the interchangeable lens configured to change a zoom position in the movable area, an area in which the focus lens support frame is driven set partially on the zoom position in the movable area and changed depending on the zoom position, wherein
the focus lens support frame has a cam groove,
the cam groove has an imaging groove section corresponding to the zoom area, and a surplus groove section corresponding to the surplus area, and
the surplus groove section has an inflection point.

2. An interchangeable lens attachable to a camera body including contrast information acquired on the basis of image signal, comprising:
- an imaging optical system having a focus lens and configured to form an optical image of a subject;
- a lens barrel configured to support the imaging optical system and having a focus lens support frame supporting the focus lens movably in a direction along the optical axis;
- a focus driver configured to drive the focus lens support frame;
- an information input part with which position information about the focus lens can be inputted; and
- a lens controller configured to control the operation of the focus driver,
- when the focus lens support frame is driven by the focus driver on the basis of the contrast information, the lens controller configured to move the focus lens via the focus driver within a movable area, the movable area having a zoom area corresponding to from the wide angle end of the imaging optical system to the telephoto end, and a surplus area used during focus point detection and provided outside of the zoom area,
- when the focus lens support frame is driven by the focus driver on the basis of the position information inputted to the information input part, the lens controller configured to move the focus lens via the focus driver only within the zoom area, and
- the interchangeable lens configured to change a zoom position in the movable area, an area in which the focus lens support frame is driven is set partially on the zoom position in the movable area and changed depending on the zoom position, wherein
- the focus lens support frame has a cam groove, and
- the cam groove has an imaging groove section corresponding to the zoom area and a surplus groove section corresponding to the surplus area, and
- the surplus groove section has an inflection point.

3. A camera system, comprising:
- an interchangeable lens having an imaging optical system that has a focus lens and that forms an optical image of a subject, a lens barrel configured to support the imaging optical system and having a focus lens support frame supporting the focus lens movably in a direction along the optical axis, a focus driver configured to drive the focus lens support frame, an information input part with which position information about the focus lens can be inputted, and a lens controller configured to control the operation of the focus driver; and
- a camera body having an imaging part configured to convert an optical image into an image signal, a contrast information acquisition part configured to acquire contrast information for focus point detection on the basis of the image signal, and a body controller configured to control the operation of the imaging part and the contrast information acquisition part and with which information can be exchanged with the lens controller,
- when the focus lens support frame is driven by the focus driver on the basis of the contrast information, the lens controller configured to move the focus lens via the focus driver within a zoom area corresponding to from the wide angle end of the imaging optical system to the telephoto end, and within a surplus area used during focus point detection and provided outside of the zoom area,
- when the focus lens support frame is driven by the focus driver on the basis of the position information inputted to the information input part, the lens controller configured to move the focus lens via the focus driver only within the zoom area,
- the focus lens support frame having a cam groove, and
- the cam groove having an imaging groove section corresponding to the zoom area, and a surplus groove section corresponding to the surplus area, the surplus groove section having an inflection point.

4. An interchangeable lens attachable to a camera body including contrast information acquired on the basis of image signal, comprising:
- an imaging optical system having a focus lens and configured to form an optical image of a subject;
- a lens barrel configured to support the imaging optical system and having a focus lens support frame supporting the focus lens movably in a direction along the optical axis;
- a focus driver configured to drive the focus lens support frame;
- an information input part with which position information about the focus lens can be inputted; and
- a lens controller configured to control the operation of the focus driver,
- when the focus lens support frame is driven by the focus driver on the basis of the contrast information, the lens controller is configured to move the focus lens via the focus driver within a zoom area corresponding to from the wide angle end of the imaging optical system to the telephoto end, and within a surplus area used during focus point detection and provided outside of the zoom area,
- when the focus lens support frame is driven by the focus driver on the basis of the position information inputted to the information input part, the lens controller is configured to move the focus lens via the focus driver only within the zoom area, and
- the focus lens support frame having a cam groove, and
- the cam groove having an imaging groove section corresponding to the zoom area, and a surplus groove section corresponding to the surplus area, the surplus groove section having an inflection point.

* * * * *